(12) United States Patent
Taniyama

(10) Patent No.: US 8,102,608 B2
(45) Date of Patent: Jan. 24, 2012

(54) IMAGING LENS, CAMERA MODULE, AND IMAGING APPARATUS

(75) Inventor: Minoru Taniyama, Saitama (JP)

(73) Assignee: Fujinon Corporation, Saitama-Shi (JP)

( * ) Notice: Subject to any disclaimer, the term of this patent is extended or adjusted under 35 U.S.C. 154(b) by 21 days.

(21) Appl. No.: 12/134,046

(22) Filed: Jun. 5, 2008

(65) Prior Publication Data

US 2009/0015944 A1 Jan. 15, 2009

(30) Foreign Application Priority Data

Jul. 10, 2007 (JP) ................................. P2007-181016

(51) Int. Cl.
*G02B 9/34* (2006.01)

(52) U.S. Cl. ....................................................... 359/773

(58) Field of Classification Search .................. 359/773, 359/775, 686
See application file for complete search history.

(56) References Cited

U.S. PATENT DOCUMENTS

| | | | |
|---|---|---|---|
| 5,936,783 A | 8/1999 | Nakai et al. | |
| 6,288,820 B1 | 9/2001 | Noda | |
| 6,288,850 B1 | 9/2001 | Otomo | |
| 6,476,982 B1 | 11/2002 | Kawakami | |
| 7,206,143 B2 | 4/2007 | Kamo et al. | |
| 7,453,654 B2 * | 11/2008 | Shinohara ..................... | 359/773 |
| 2006/0209429 A1 | 9/2006 | Sato et al. | |
| 2007/0008625 A1 | 1/2007 | Park et al. | |
| 2007/0014033 A1 * | 1/2007 | Shinohara ..................... | 359/692 |
| 2007/0081259 A1 | 4/2007 | Noda | |

FOREIGN PATENT DOCUMENTS

| | | |
|---|---|---|
| CN | 1834717 A | 9/2006 |
| DE | 199 19 400 A1 | 11/1999 |
| EP | 1 742 094 A1 | 1/2007 |
| EP | 1 821 129 A1 | 8/2007 |
| JP | 7-104181 A | 4/1995 |
| JP | 2002-221659 A | 8/2002 |
| JP | 3424030 B2 | 5/2003 |
| JP | 2004-302057 A | 10/2004 |
| JP | 2004-341013 A | 12/2004 |
| JP | 2005-24581 A | 1/2005 |
| JP | 2005-24889 A | 1/2005 |
| JP | 2005-351972 A | 12/2005 |
| JP | 2006293324 A | 10/2006 |
| JP | 2007-17984 A | 1/2007 |

OTHER PUBLICATIONS

Haferkorn, "Optik", pp. 306-309, 1994, XP002538554.

* cited by examiner

*Primary Examiner* — Alicia M Harrington
(74) *Attorney, Agent, or Firm* — Birch, Stewart, Kolasch & Birch, LLP

(57) ABSTRACT

An imaging lens is provided and includes: in order from an object side of the imaging lens, a first lens having a positive power; a second lens having a negative power; a third lens having a positive power and having a convex surface on an image side thereof; and a fourth lens having a negative power and having a concave surface or a flat surface on the object side and in a vicinity of an optical axis thereof, and the imaging lens satisfies conditional expression:

$$0.28<|f4/f|<0.60 \qquad (1)$$

where f is a focal length of the imaging lens, and f4 is a focal length of the fourth lens.

21 Claims, 19 Drawing Sheets

EXAMPLE 2

EXAMPLE 1

EXAMPLE 2

EXAMPLE 3

EXAMPLE 4

EXAMPLE 5

EXAMPLE 6

FIG. 9A

AD: APERTURE DIAPHRAGM

| EXAMPLE1: BASIC LENS DATA | | | | |
|---|---|---|---|---|
| Si (SURFACE NUMBER) | Ri (RADIUS OF CURVATURE) | Di (SURFACE SPACING) | Ndj (REFRACTIVE INDEX) | $\nu$ dj (ABBE NUMBER) |
| 0 ( AD ) | — | −0.10 | | |
| 1 | 3.093 | 0.93 | 1.510 | 56.2 |
| 2 | −5.105 | 0.13 | | |
| 3 | 8.373 | 0.58 | 1.606 | 27.0 |
| 4 | 2.479 | 0.88 | | |
| 5 | −6.419 | 1.65 | 1.531 | 55.5 |
| 6 | −1.014 | 0.07 | | |
| 7 | −86.215 | 0.54 | 1.531 | 55.5 |
| 8 | 1.059 | 0.70 | | |
| 9 | ∞ | 0.30 | 1.516 | 64.1 |
| 10 | ∞ | 1.44 | | |

(f=5.97, Fno.=2.80)

FIG. 9B

| | EXAMPLE1: ASPHERICAL DATA | | | |
|---|---|---|---|---|
| ASPHERICAL COEFFICIENT | SURFACE NUMBER | | | |
| | FIRST SURFACE | SECOND SURFACE | THIRD SURFACE | FOURTH SURFACE |
| K | −2.776E+00 | 5.775E+00 | −9.999E+00 | 1.093E+00 |
| A3 | 1.287E−03 | −6.614E−03 | −3.276E−03 | 4.492E−03 |
| A4 | −2.194E−03 | −5.682E−03 | −2.148E−02 | −2.997E−02 |
| A5 | 1.627E−03 | −1.956E−02 | −7.247E−03 | 3.626E−02 |
| A6 | 1.058E−04 | −7.340E−03 | 1.007E−02 | −3.279E−02 |
| A7 | −7.512E−03 | −2.075E−03 | −3.054E−02 | −7.027E−03 |
| A8 | −1.721E−02 | 4.685E−03 | −3.520E−03 | 1.107E−02 |
| A9 | 2.061E−02 | 3.672E−03 | 3.987E−02 | 6.398E−03 |
| A10 | −9.272E−03 | −3.366E−03 | −1.589E−02 | −3.922E−03 |
| | FIFTH SURFACE | SIXTH SURFACE | SEVENTH SURFACE | EIGHTH SURFACE |
| K | 5.996E+00 | −2.973E+00 | 1.998E+01 | −5.397E+00 |
| A3 | 6.828E−03 | 1.070E−02 | −1.683E−02 | −1.618E−02 |
| A4 | −5.262E−03 | −3.270E−02 | −1.822E−02 | −6.029E−02 |
| A5 | 1.917E−02 | 1.121E−02 | −5.572E−03 | 3.901E−02 |
| A6 | 4.231E−03 | −1.065E−03 | 2.235E−03 | −7.115E−03 |
| A7 | −7.370E−03 | 8.014E−04 | 2.130E−03 | −2.175E−03 |
| A8 | −1.448E−03 | 9.899E−04 | −5.646E−04 | 4.853E−04 |
| A9 | 3.181E−03 | 5.533E−04 | −1.153E−04 | 2.420E−04 |
| A10 | −9.804E−04 | −3.558E−04 | 5.073E−05 | −6.412E−05 |

FIG. 10A

AD: APERTURE DIAPHRAGM

EXAMPLE 2: BASIC LENS DATA

| Si (SURFACE NUMBER) | Ri (RADIUS OF CURVATURE) | Di (SURFACE SPACING) | Ndj (REFRACTIVE INDEX) | νdj (ABBE NUMBER) |
|---|---|---|---|---|
| 0 (AD) | — | 0.00 | | |
| 1 | 2.377 | 0.82 | 1.510 | 56.2 |
| 2 | -5.245 | 0.14 | | |
| 3 | 10.310 | 0.50 | 1.604 | 27.2 |
| 4 | 2.641 | 0.85 | | |
| 5 | -7.173 | 1.10 | 1.510 | 56.2 |
| 6 | -1.205 | 0.15 | | |
| 7 | -1005.454 | 0.56 | 1.510 | 56.2 |
| 8 | 1.167 | 0.60 | | |
| 9 | ∞ | 0.30 | 1.516 | 64.1 |
| 10 | ∞ | 0.59 | | |

(f=4.70, Fno.=2.80)

FIG. 10B

EXAMPLE 2: ASPHERICAL DATA

| ASPHERICAL COEFFICIENT | SURFACE NUMBER | | | |
|---|---|---|---|---|
| | FIRST SURFACE | SECOND SURFACE | THIRD SURFACE | FOURTH SURFACE |
| K | 3.243E-01 | -2.445E+01 | -4.742E+01 | -5.091E+00 |
| A3 | 2.405E-05 | -5.891E-03 | -4.928E-04 | 4.629E-02 |
| A4 | -4.509E-03 | 2.594E-04 | 2.332E-02 | -1.051E-01 |
| A5 | -1.308E-02 | -3.895E-02 | -6.358E-02 | 2.266E-01 |
| A6 | -1.605E-03 | -1.720E-02 | 8.375E-02 | -1.375E-01 |
| A7 | -4.694E-03 | -4.822E-03 | -9.906E-02 | -8.578E-02 |
| A8 | 2.316E-03 | 1.328E-02 | -6.093E-02 | 5.888E-02 |
| A9 | -9.723E-03 | 1.160E-02 | 1.993E-01 | 7.374E-02 |
| A10 | 1.829E-03 | -8.787E-03 | -8.690E-02 | -4.250E-02 |
| | FIFTH SURFACE | SIXTH SURFACE | SEVENTH SURFACE | EIGHTH SURFACE |
| K | 1.000E+01 | -6.711E+00 | -4.998E+01 | -5.936E+00 |
| A3 | 1.113E-02 | -1.661E-01 | -1.201E-01 | -9.065E-03 |
| A4 | -1.430E-02 | 3.553E-02 | 2.232E-03 | -1.085E-01 |
| A5 | -1.981E-03 | 3.944E-02 | -2.077E-02 | 7.107E-02 |
| A6 | 2.764E-02 | -1.280E-02 | 7.948E-03 | -1.437E-02 |
| A7 | -1.867E-02 | -4.571E-03 | 1.062E-02 | -4.911E-03 |
| A8 | -1.039E-02 | 2.007E-03 | -1.593E-03 | 1.442E-03 |
| A9 | 1.403E-02 | 3.686E-03 | -6.320E-04 | 7.314E-04 |
| A10 | -6.164E-03 | -1.149E-03 | -3.836E-05 | -2.517E-04 |

FIG. 11A

AD: APERTURE DIAPHRAGM

| EXAMPLE 3: BASIC LENS DATA | | | | |
|---|---|---|---|---|
| Si (SURFACE NUMBER) | Ri (RADIUS OF CURVATURE) | Di (SURFACE SPACING) | Ndj (REFRACTIVE INDEX) | $\nu dj$ (ABBE NUMBER) |
| 0 ( AD ) | — | -0.10 | | |
| 1 | 3.302 | 0.85 | 1.592 | 68.3 |
| 2 | -3.925 | 0.05 | | |
| 3 | -15.243 | 0.94 | 1.606 | 27.0 |
| 4 | 3.081 | 1.00 | | |
| 5 | -4.617 | 1.17 | 1.531 | 55.5 |
| 6 | -1.154 | 0.06 | | |
| 7 | -532.113 | 0.65 | 1.531 | 55.5 |
| 8 | 1.407 | 0.75 | | |
| 9 | ∞ | 0.30 | 1.516 | 64.1 |
| 10 | ∞ | 1.28 | | |

(f=5.85, Fno.=2.80)

FIG. 11B

| EXAMPLE 3: ASPHERICAL DATA | | | | |
|---|---|---|---|---|
| ASPHERICAL COEFFICIENT | SURFACE NUMBER | | | |
| | FIRST SURFACE | SECOND SURFACE | THIRD SURFACE | FOURTH SURFACE |
| K | -4.102E+00 | -1.142E+00 | -9.839E+00 | 1.859E+00 |
| A3 | 1.254E-03 | 2.848E-02 | 3.374E-02 | 9.737E-03 |
| A4 | -2.328E-03 | 9.539E-03 | 1.497E-02 | -2.061E-02 |
| A5 | 6.683E-03 | -2.088E-02 | -1.494E-02 | 3.687E-02 |
| A6 | -1.896E-03 | -1.658E-02 | 5.059E-03 | -2.621E-02 |
| A7 | -1.073E-02 | -6.666E-03 | -2.743E-02 | -4.880E-03 |
| A8 | -1.647E-02 | 8.428E-03 | 9.779E-05 | 8.107E-03 |
| A9 | 2.375E-02 | 9.392E-03 | 3.994E-02 | 3.353E-03 |
| A10 | -8.910E-03 | -5.846E-03 | -1.828E-02 | -2.323E-03 |
| | FIFTH SURFACE | SIXTH SURFACE | SEVENTH SURFACE | EIGHTH SURFACE |
| K | 8.231E+00 | -2.918E+00 | -2.000E+01 | -7.081E+00 |
| A3 | 5.467E-03 | -8.796E-04 | -9.360E-03 | -7.938E-03 |
| A4 | -1.009E-02 | -3.087E-02 | -1.831E-02 | -6.402E-02 |
| A5 | 1.909E-02 | 1.067E-02 | -4.348E-03 | 3.834E-02 |
| A6 | 4.094E-03 | -1.152E-03 | 2.448E-03 | -6.907E-03 |
| A7 | -7.135E-03 | 9.034E-04 | 2.054E-03 | -2.130E-03 |
| A8 | -9.983E-04 | 1.031E-03 | -6.391E-04 | 4.752E-04 |
| A9 | 3.400E-03 | 4.932E-04 | -1.458E-04 | 2.341E-04 |
| A10 | -1.097E-03 | -4.709E-04 | 4.800E-05 | -6.353E-05 |

FIG. 12A

AD: APERTURE DIAPHRAGM

| EXAMPLE 4: BASIC LENS DATA ||||||
| Si (SURFACE NUMBER) | Ri (RADIUS OF CURVATURE) | Di (SURFACE SPACING) | Ndj (REFRACTIVE INDEX) | $\nu dj$ (ABBE NUMBER) |
|---|---|---|---|---|
| 0 ( AD ) | — | -0.10 | | |
| 1 | 3.165 | 1.01 | 1.510 | 56.2 |
| 2 | -5.179 | 0.13 | | |
| 3 | 9.332 | 0.61 | 1.606 | 27.0 |
| 4 | 2.572 | 0.97 | | |
| 5 | -4.777 | 1.15 | 1.531 | 55.5 |
| 6 | -1.173 | 0.13 | | |
| 7 | -610.219 | 0.66 | 1.531 | 55.5 |
| 8 | 1.435 | 0.75 | | |
| 9 | ∞ | 0.30 | 1.516 | 64.1 |
| 10 | ∞ | 1.31 | | |

(f=5.74, Fno.=2.80)

FIG. 12B

| EXAMPLE 4: ASPHERICAL DATA |||||
| ASPHERICAL COEFFICIENT | SURFACE NUMBER ||||
| | FIRST SURFACE | SECOND SURFACE | THIRD SURFACE | FOURTH SURFACE |
|---|---|---|---|---|
| K | -1.975E+00 | 3.977E+00 | -1.008E+01 | 9.926E-01 |
| A3 | -6.847E-05 | -2.102E-03 | 1.157E-03 | 5.284E-03 |
| A4 | -3.428E-04 | -3.274E-03 | -1.837E-02 | -3.024E-02 |
| A5 | 1.820E-03 | -1.460E-02 | -7.105E-03 | 3.587E-02 |
| A6 | -9.631E-05 | -5.584E-03 | 1.037E-02 | -3.255E-02 |
| A7 | -7.386E-03 | -3.088E-03 | -2.957E-02 | -6.957E-03 |
| A8 | -1.656E-02 | 3.354E-03 | -2.643E-03 | 1.112E-02 |
| A9 | 2.177E-02 | 3.578E-03 | 4.003E-02 | 6.463E-03 |
| A10 | -7.713E-03 | -1.652E-03 | -1.687E-02 | -3.914E-03 |
| | FIFTH SURFACE | SIXTH SURFACE | SEVENTH SURFACE | EIGHTH SURFACE |
| K | 5.528E+00 | -2.437E+00 | -2.000E+01 | -5.727E+00 |
| A3 | -1.318E-03 | -1.359E-03 | -5.308E-04 | -6.794E-03 |
| A4 | -3.557E-03 | -2.884E-02 | -2.247E-02 | -6.418E-02 |
| A5 | 2.279E-02 | 1.137E-02 | -6.087E-03 | 3.795E-02 |
| A6 | 5.467E-03 | -1.065E-03 | 2.011E-03 | -6.997E-03 |
| A7 | -7.608E-03 | 9.228E-04 | 2.017E-03 | -2.101E-03 |
| A8 | -1.960E-03 | 1.086E-03 | -5.951E-04 | 4.993E-04 |
| A9 | 2.979E-03 | 5.804E-04 | -1.104E-04 | 2.406E-04 |
| A10 | -7.618E-04 | -3.769E-04 | 6.291E-05 | -6.679E-05 |

FIG. 13A

AD: APERTURE DIAPHRAGM

EXAMPLE 5: BASIC LENS DATA

| Si (SURFACE NUMBER) | Ri (RADIUS OF CURVATURE) | Di (SURFACE SPACING) | Ndj (REFRACTIVE INDEX) | $\nu dj$ (ABBE NUMBER) |
|---|---|---|---|---|
| 0 ( AD ) | — | 0.00 | | |
| 1 | 2.422 | 0.82 | 1.510 | 56.2 |
| 2 | -5.608 | 0.13 | | |
| 3 | 10.000 | 0.52 | 1.604 | 27.2 |
| 4 | 2.574 | 0.95 | | |
| 5 | 200.000 | 1.18 | 1.510 | 56.2 |
| 6 | -1.161 | 0.13 | | |
| 7 | -6.615 | 0.53 | 1.510 | 56.2 |
| 8 | 1.238 | 0.60 | | |
| 9 | ∞ | 0.30 | 1.516 | 64.1 |
| 10 | ∞ | 0.46 | | |

(f=4.53, Fno.=2.80)

FIG. 13B

EXAMPLE 5: ASPHERICAL DATA

| ASPHERICAL COEFFICIENT | SURFACE NUMBER | | | |
|---|---|---|---|---|
| | FIRST SURFACE | SECOND SURFACE | THIRD SURFACE | FOURTH SURFACE |
| K | 5.124E-01 | -3.160E+01 | -5.814E+01 | -5.986E+00 |
| A3 | 3.051E-04 | -1.116E-02 | -7.026E-03 | 3.995E-02 |
| A4 | -2.776E-03 | 6.212E-03 | 1.694E-02 | -1.053E-01 |
| A5 | -1.347E-02 | -3.589E-02 | -5.739E-02 | 2.270E-01 |
| A6 | -3.903E-04 | -1.388E-02 | 8.690E-02 | -1.344E-01 |
| A7 | -2.222E-03 | -5.525E-03 | -9.830E-02 | -8.351E-02 |
| A8 | 3.567E-03 | 1.271E-02 | -6.314E-02 | 5.773E-02 |
| A9 | -9.995E-03 | 1.332E-02 | 1.978E-01 | 7.125E-02 |
| A10 | 2.306E-03 | -8.793E-03 | -8.683E-02 | -4.252E-02 |
| | FIFTH SURFACE | SIXTH SURFACE | SEVENTH SURFACE | EIGHTH SURFACE |
| K | 9.834E+00 | -5.852E+00 | -3.667E+01 | -6.529E+00 |
| A3 | -1.642E-03 | -1.648E-01 | -1.226E-01 | 1.321E-03 |
| A4 | -2.053E-02 | 2.997E-02 | 5.272E-03 | -1.097E-01 |
| A5 | -3.355E-03 | 3.890E-02 | -2.016E-02 | 7.129E-02 |
| A6 | 2.935E-02 | -1.246E-02 | 8.117E-03 | -1.450E-02 |
| A7 | -1.737E-02 | -4.461E-03 | 1.071E-02 | -4.972E-03 |
| A8 | -9.998E-03 | 1.985E-03 | -1.550E-03 | 1.432E-03 |
| A9 | 1.432E-02 | 3.601E-03 | -6.312E-04 | 7.362E-04 |
| A10 | -5.337E-03 | -1.282E-03 | -6.045E-05 | -2.456E-04 |

FIG. 14A

AD: APERTURE DIAPHRAGM

| EXAMPLE 6: BASIC LENS DATA | | | | |
|---|---|---|---|---|
| Si (SURFACE NUMBER) | Ri (RADIUS OF CURVATURE) | Di (SURFACE SPACING) | Ndj (REFRACTIVE INDEX) | $\nu$dj (ABBE NUMBER) |
| 0 ( AD ) | — | -0.08 | | |
| 1 | 2.437 | 0.78 | 1.542 | 62.9 |
| 2 | -51.614 | 0.30 | | |
| 3 | 5.010 | 0.45 | 1.604 | 27.2 |
| 4 | 2.905 | 0.90 | | |
| 5 | -7.297 | 0.93 | 1.510 | 55.5 |
| 6 | -1.151 | 0.18 | | |
| 7 | -1005.431 | 0.50 | 1.510 | 55.5 |
| 8 | 1.123 | 0.60 | | |
| 9 | ∞ | 0.30 | 1.516 | 64.1 |
| 10 | ∞ | 0.57 | | |

(f=4.62, Fno.=2.80)

FIG. 14B

| EXAMPLE 6: ASPHERICAL DATA | | | | |
|---|---|---|---|---|
| ASPHERICAL COEFFICIENT | SURFACE NUMBER | | | |
| | FIRST SURFACE | SECOND SURFACE | THIRD SURFACE | FOURTH SURFACE |
| K | 5.027E-01 | 2.501E+01 | -4.148E+01 | -8.857E+00 |
| A3 | 4.216E-05 | -1.294E-02 | -1.213E-02 | 4.155E-02 |
| A4 | -5.830E-03 | -2.320E-02 | 7.036E-03 | -1.135E-01 |
| A5 | -1.677E-02 | -3.081E-02 | -6.703E-02 | 2.244E-01 |
| A6 | -1.518E-04 | -1.020E-02 | 8.536E-02 | -1.366E-01 |
| A7 | -1.009E-03 | -3.453E-03 | -9.832E-02 | -8.404E-02 |
| A8 | 4.789E-03 | 1.160E-02 | -6.213E-02 | 5.986E-02 |
| A9 | -1.005E-02 | 9.490E-03 | 1.978E-01 | 7.348E-02 |
| A10 | -8.426E-04 | -1.075E-02 | -8.675E-02 | -4.399E-02 |
| | FIFTH SURFACE | SIXTH SURFACE | SEVENTH SURFACE | EIGHTH SURFACE |
| K | 8.350E+00 | -6.003E+00 | 4.951E+01 | -5.739E+00 |
| A3 | 1.175E-02 | -1.607E-01 | -1.249E-01 | -1.074E-02 |
| A4 | -2.018E-02 | 2.809E-02 | 2.835E-03 | -1.101E-01 |
| A5 | -2.026E-04 | 3.868E-02 | -2.097E-02 | 7.298E-02 |
| A6 | 2.905E-02 | -1.268E-02 | 7.956E-03 | -1.425E-02 |
| A7 | -1.825E-02 | -4.400E-03 | 1.064E-02 | -5.014E-03 |
| A8 | -1.028E-02 | 2.143E-03 | -1.581E-03 | 1.401E-03 |
| A9 | 1.434E-02 | 3.777E-03 | -6.305E-04 | 7.255E-04 |
| A10 | -5.519E-03 | -1.095E-03 | -4.188E-05 | -2.483E-04 |

FIG. 15A

AD: APERTURE DIAPHRAGM

| EXAMPLE 7: BASIC LENS DATA | | | | |
|---|---|---|---|---|
| Si (SURFACE NUMBER) | Ri (RADIUS OF CURVATURE) | Di (SURFACE SPACING) | Ndj (REFRACTIVE INDEX) | $\nu dj$ (ABBE NUMBER) |
| 0 ( AD ) | — | -0.08 | | |
| 1 | 2.293 | 0.84 | 1.510 | 56.2 |
| 2 | -5.948 | 0.14 | | |
| 3 | 6.340 | 0.49 | 1.604 | 27.2 |
| 4 | 2.396 | 0.86 | | |
| 5 | -6.954 | 0.91 | 1.510 | 56.2 |
| 6 | -1.911 | 0.25 | | |
| 7 | -386.600 | 0.87 | 1.510 | 56.2 |
| 8 | 1.819 | 0.60 | | |
| 9 | ∞ | 0.30 | 1.516 | 64.1 |
| 10 | ∞ | 0.28 | | |

(f=4.70, Fno.=2.80)

FIG. 15B

| EXAMPLE 7: ASPHERICAL DATA | | | | |
|---|---|---|---|---|
| ASPHERICAL COEFFICIENT | SURFACE NUMBER | | | |
| | FIRST SURFACE | SECOND SURFACE | THIRD SURFACE | FOURTH SURFACE |
| K | -2.862E-01 | 5.500E+00 | -5.009E-01 | -4.005E+00 |
| A3 | 2.522E-03 | -3.201E-03 | -2.476E-03 | 4.243E-02 |
| A4 | -1.133E-02 | -1.298E-02 | 1.720E-02 | -1.007E-01 |
| A5 | -1.233E-03 | -4.320E-02 | -6.807E-02 | 2.303E-01 |
| A6 | 1.395E-03 | -9.532E-03 | 8.308E-02 | -1.396E-01 |
| A7 | -9.811E-03 | 2.234E-03 | -9.819E-02 | -8.727E-02 |
| A8 | -5.567E-03 | 1.215E-02 | -6.009E-02 | 5.955E-02 |
| A9 | -1.276E-02 | 5.411E-03 | 2.004E-01 | 7.518E-02 |
| A10 | 5.933E-03 | -1.009E-02 | -8.751E-02 | -4.222E-02 |
| | FIFTH SURFACE | SIXTH SURFACE | SEVENTH SURFACE | EIGHTH SURFACE |
| K | 6.943E+00 | -1.588E+01 | -5.000E+01 | -8.447E+00 |
| A3 | 4.888E-03 | -1.814E-01 | -1.278E-01 | 3.210E-02 |
| A4 | -5.648E-03 | 2.056E-02 | 6.832E-03 | -1.205E-01 |
| A5 | -1.208E-02 | 4.431E-02 | -2.102E-02 | 7.305E-02 |
| A6 | 2.517E-02 | -9.036E-03 | 7.997E-03 | -1.463E-02 |
| A7 | -1.579E-02 | -3.402E-03 | 1.079E-02 | -5.183E-03 |
| A8 | -7.034E-03 | 1.998E-03 | -1.499E-03 | 1.373E-03 |
| A9 | 1.509E-02 | 3.432E-03 | -6.293E-04 | 7.401E-04 |
| A10 | -8.293E-03 | -1.319E-03 | -8.013E-05 | -2.302E-04 |

FIG. 16A

AD: APERTURE DIAPHRAGM

| EXAMPLE 8: BASIC LENS DATA | | | | |
|---|---|---|---|---|
| Si (SURFACE NUMBER) | Ri (RADIUS OF CURVATURE) | Di (SURFACE SPACING) | Ndj (REFRACTIVE INDEX) | νdj (ABBE NUMBER) |
| 0 ( AD ) | — | −0.08 | | |
| 1 | 2.320 | 0.86 | 1.510 | 56.2 |
| 2 | −6.080 | 0.13 | | |
| 3 | 7.214 | 0.47 | 1.604 | 27.2 |
| 4 | 2.575 | 0.87 | | |
| 5 | −6.442 | 0.95 | 1.510 | 56.2 |
| 6 | −1.411 | 0.23 | | |
| 7 | ∞ | 0.62 | 1.510 | 56.2 |
| 8 | 1.361 | 0.60 | | |
| 9 | ∞ | 0.30 | 1.516 | 64.1 |
| 10 | ∞ | 0.43 | | |

(f=4.61, Fno.=2.80)

FIG. 16B

| EXAMPLE 8: ASPHERICAL DATA | | | | |
|---|---|---|---|---|
| ASPHERICAL COEFFICIENT | SURFACE NUMBER | | | |
| | FIRST SURFACE | SECOND SURFACE | THIRD SURFACE | FOURTH SURFACE |
| K | 3.451E−01 | −8.665E+00 | −5.014E+01 | −4.916E+00 |
| A3 | −2.263E−04 | −6.316E−03 | −1.801E−03 | 4.713E−02 |
| A4 | −4.091E−03 | −3.939E−03 | 2.023E−02 | −1.022E−01 |
| A5 | −1.468E−02 | −3.696E−02 | −6.203E−02 | 2.270E−01 |
| A6 | −1.610E−03 | −1.534E−02 | 8.449E−02 | −1.370E−01 |
| A7 | −3.618E−03 | −4.523E−03 | −9.952E−02 | −8.508E−02 |
| A8 | 3.098E−03 | 1.293E−02 | −6.205E−02 | 5.931E−02 |
| A9 | −9.809E−03 | 1.121E−02 | 1.985E−01 | 7.369E−02 |
| A10 | 1.125E−03 | −9.422E−03 | −8.643E−02 | −4.312E−02 |
| | FIFTH SURFACE | SIXTH SURFACE | SEVENTH SURFACE | EIGHTH SURFACE |
| K | 8.761E+00 | −7.985E+00 | −5.000E+01 | −6.175E+00 |
| A3 | 1.025E−02 | −1.674E−01 | −1.234E−01 | 4.146E−03 |
| A4 | −1.299E−02 | 3.119E−02 | 4.760E−03 | −1.141E−01 |
| A5 | −1.550E−03 | 4.082E−02 | −2.096E−02 | 7.255E−02 |
| A6 | 2.822E−02 | −1.216E−02 | 7.900E−03 | −1.421E−02 |
| A7 | −1.851E−02 | −4.316E−03 | 1.062E−02 | −4.953E−03 |
| A8 | −1.035E−02 | 2.112E−03 | −1.593E−03 | 1.421E−03 |
| A9 | 1.418E−02 | 3.727E−03 | −6.357E−04 | 7.264E−04 |
| A10 | −5.863E−03 | −1.139E−03 | −4.323E−05 | −2.505E−04 |

FIG. 17

|  | CONDITIONAL EXPRESSION (1) \| f4/f \| | CONDITIONAL EXPRESSION (2) f1/f | CONDITIONAL EXPRESSION (3) \| f2/f \| | CONDITIONAL EXPRESSION (4) f3/f | CONDITIONAL EXPRESSION (5) $\nu 1 - \nu 2$ | CONDITIONAL EXPRESSION (6) D4/f |
|---|---|---|---|---|---|---|
| EXAMPLE 1 | 0.329 | 0.658 | 1.011 | 0.344 | 29.2 | 0.147 |
| EXAMPLE 2 | 0.486 | 0.708 | 1.282 | 0.568 | 29.0 | 0.180 |
| EXAMPLE 3 | 0.452 | 0.541 | 0.709 | 0.444 | 41.3 | 0.171 |
| EXAMPLE 4 | 0.470 | 0.699 | 1.056 | 0.459 | 29.2 | 0.170 |
| EXAMPLE 5 | 0.442 | 0.758 | 1.301 | 0.501 | 29.0 | 0.211 |
| EXAMPLE 6 | 0.476 | 0.934 | 2.696 | 0.552 | 35.7 | 0.194 |
| EXAMPLE 7 | 0.752 | 0.713 | 1.411 | 1.033 | 29.0 | 0.184 |
| EXAMPLE 8 | 0.579 | 0.740 | 1.496 | 0.723 | 29.0 | 0.190 |
| COMPARATIVE EXAMPLE 1 | 0.268 | 1.298 | 1.822 | 0.342 | 38.4 | 0.307 |
| COMPARATIVE EXAMPLE 2 | 0.616 | 0.459 | 0.827 | 1.164 | 35.3 | 0.280 |

EXAMPLE 1

EXAMPLE 2

EXAMPLE 3
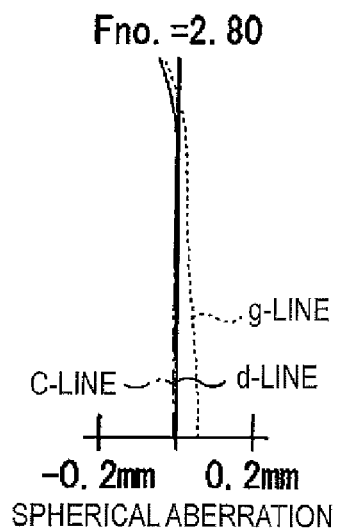
FIG. 20A
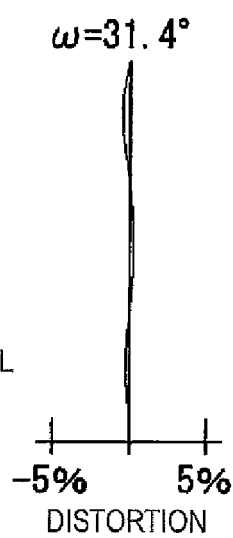
FIG. 20B
FIG. 20C
EXAMPLE 4
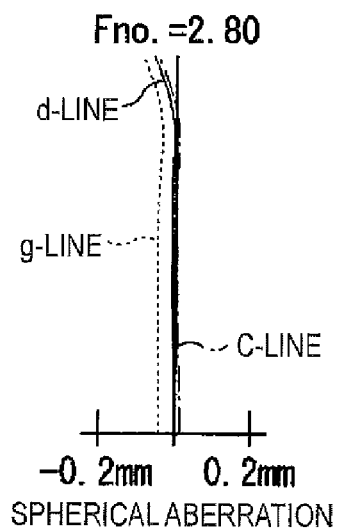
FIG. 21A
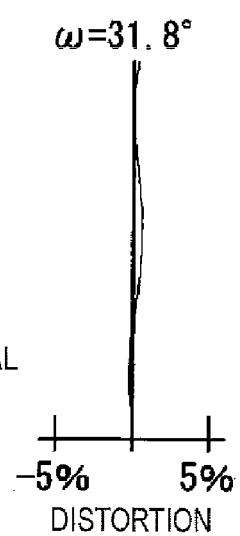
FIG. 21B
FIG. 21C

EXAMPLE 5

EXAMPLE 6

EXAMPLE 7

EXAMPLE 8

IMAGING LENS, CAMERA MODULE, AND IMAGING APPARATUS

This application is based on and claims priority under 35 U.S.C §119 from Japanese Patent Application No. 2007-181016, filed on Jul. 10, 2007, the entire disclosure of which is herein incorporated by reference.

BACKGROUND OF THE INVENTION

1. Field of the Invention

The present invention relates to an imaging lens that forms an optical image of a subject on an imaging device such as a CCD (Charge Coupled Device) or a CMOS (Complementary Metal Oxide Semiconductor), a camera module that converts the optical image formed by the imaging lens into an imaging signal, and an imaging apparatus such as a cellular phone and a portable information terminal (PDA: Personal Digital Assistance) equipped with a camera or a digital still camera that performs photographing with the imaging lens mounted therein.

2. Description of Related Art

In recent years, as personal computers have become popular in homes, digital still cameras capable of transferring image information about scenes, persons, and the like photographed into the personal computers have spread rapidly. In addition, the incorporation of a camera module for inputting images into a cellular phone has been increasing. In these imaging apparatuses, there are used imaging devices such as a CCD and a CMOS. In such imaging apparatus, recently, because the imaging device has been downsized, it has been also required to downsize the whole of the imaging apparatus and an imaging lens mounted therein. Also, since the number of pixels included in the imaging device has also been increasing, it has been required to enhance the resolution and performance of the imaging device.

In JP-A-2002-221659, JP-A-2004-302057, JP-A-2004-341013, JP-A-2005-24581, JP-A-2005-24889, Japanese Patent No. 3424030 and JP-A-2007-17984, an imaging lens formed of three or four lenses is disclosed. As described in these patent documents, the known imaging lens includes four-lens configurations having an arrangement oft in order from the object side, positive, negative, positive, and positive power or having an arrangement of positive, negative, positive, and negative power. In the case of the imaging lens having the four-lens configuration, a lens closest to the imaging side mostly has a convex surface on the object side on the paraxial axis (in the vicinity of the optical axis). On the other hand, in Examples 5 and 9 of JP-A-2007-17984, there is disclosed a configuration in which a lens system has arrangement of positive, negative, positive, negative power and a lens surface closest to the imaging side is concave directed to the object side in the vicinity of the optical axis thereof.

As described above, recently, the imaging device has been reduced in size and has been increased in the number of pixels included therein. Especially, with respect to the imaging lens for a mobile camera module, there have been mainly required cost performance and compactness. However, recently, in the mobile camera module as well, the number of pixels included in the imaging device has been increasing and thus the need for the enhanced performance of the mobile camera module has been increasing. Thus, there has been desired the development of various lenses which are improved comprehensively in the cost, performance, and compactness thereof. For example, there has been desired the development of a low-cost and high-performance imaging lens which not only can secure compactness capable of use in a module camera for a cellular phone but also can provide a high performance capable of use in a digital camera. However, in these lenses described in patent documents mentioned above, for example, the image forming performance and compactness do not go together sufficiently. In addition, in JP-A-2007-17984, there is disclosed an imaging lens having various types of four-lens configurations, but it is hard to say that sufficiently optimized conditions are applied to the respective exemplary configurations.

SUMMARY OF THE INVENTION

An object of an illustrative, non-limiting embodiment of the invention is to provide: an imaging lens, which can decrease size of the whole system and achieve high imaging performance; a camera module having the imaging lens mounted thereon, which can obtain an imaging signal having high resolution; and an imaging apparatus that has the camera module.

According to a first aspect of the invention, there is provided an imaging lens including: in order from the object side; a first lens having a positive power; a second lens having a negative power; a third lens having a positive power and having a convex surface on the image side, and a fourth lens having a negative power and having a concave surface or a flat surface on the object side and in the vicinity of the optical axis, and the imaging lens satisfying the following conditional expression. Here, f is defined as a focal length of the whole system, (the imaging lens) and f4 is defined as a focal length of the fourth lens.

$$0.28 < |f4|/f < 0.60 \quad (1)$$

According to a second aspect of the invention, there is provided an imaging lens including: in order from the object side; a first lens having a positive power; a second lens having a negative power; a third lens having a positive power and having a convex surface on the image side, and a fourth lens having a negative power and having a concave surface or a flat surface on the object side and in the vicinity of the optical axis, and the imaging lens satisfying the following conditional expression. Here, f is defined as a focal length of the whole system, and f1 is defined as a focal length of the first lens.

$$0.50 < f1/f < 1.10 \quad (2)$$

In the imaging lens according to the first or the second aspect, the whole lens system is configured to include four lenses in which each lens shape and power is appropriately set and the specific conditional expression is satisfied. Thus, it becomes easy to decrease the size of the whole system and obtain high imaging performance. Particularly, in the imaging lens, the lens (the fourth lens) closest to the imaging side has a concave surface or flat surface directed toward the object side in the vicinity of the optical axis. Thus, this configuration is also advantageous in the decrease in size of the whole system and imaging performance.

In addition, by properly employing the following preferred configurations, this configuration is more advantageous in the decrease in size of the whole system and imaging performance.

In the imaging lens according to the first or the second aspect, the following conditions may be properly and selectively satisfied. Here, f2 is defined as a focal length of the second lens, and f3 is defined as a focal length of the third lens. V1 is defined as an Abbe number of the first lens at the d-line, and v2 is defined as an Abbe number of the second lens at the d-line. D4 is defined as a space on the optical axis between the second lens and the third lens. R5 is defined as a radius of curvature of an object side surface of the third lens, and R6 is defined as a radius of curvature of an image side surface of the third lens.

By properly and selectively satisfying the following conditions, the lens configurations are more optimized, and thus are advantageous in the decrease in size of the whole system and imaging performance.

$$0.5<|f2/f|<3 \quad (3)$$

$$0.2<f3/f<1.5 \quad (4)$$

$$20<v1-v2 \quad (5)$$

$$0.1<D4/f<0.3 \quad (6)$$

$$|R5|>|R6| \quad (7)$$

In addition, the first lens may have a biconvex shape. In addition, the second lens may have a meniscus shape in which a convex surface is directed toward the object side. In addition, each of the first lens, the second lens, the third lens, and the fourth lens may include at least one aspheric surface.

In addition, each of the first lens, the second lens, the third lens, and the fourth lens may be made of resin. Thereby, this configuration is advantageous in reduction of manufacturing costs. Further, to achieve high performance, for example, the first lens may be made of glass.

In addition, in the imaging lens according to the first or the second aspect, a stop may be disposed on the optical axis between a vertex of an object side surface of the first lens and a vertex of an image side surface of the first lens. Further, a stop may be disposed closer to the object side, for example, on the optical axis between the vertex of the object side surface of the first lens and an end edge of the object side surface of the first lens.

According to an aspect of the invention, there is provided a camera module including an imaging lens according to the first or the second aspect, and an imaging device for outputting an imaging signal based on an optical image formed by the imaging lens.

In the camera module, a high resolution imaging signal is obtained based on an optical image formed by the imaging lens. In addition, the imaging lens is configured to decrease size of the whole system, and thus the camera module combined with the imaging lens is downsized as a whole.

According to an aspect of the invention, there is provided an imaging apparatus including a camera module according to the aspect above.

In the imaging apparatus, a high resolution imaging signal is obtained based on a high resolution optical image obtained by the camera module, and a high resolution photographic image is obtained based on the imaging signal.

BRIEF DESCRIPTION OF THE DRAWINGS

The features of the invention will appear more fully upon consideration of the exemplary embodiment of the invention, which are schematically set forth in the drawings, in which:

FIGS. 9A and 9B are diagram showing lens data of the imaging lens according to Example 1, where FIG. 9A shows basic lens data, and FIG. 9B shows aspherical data;

FIGS. 10A and 10B are diagrams showing lens data of the imaging lens according to Example 2, where FIG. 10A shows basic lens data, and FIG. 10B shows aspherical data;

FIGS. 11A and 11B are diagrams showing lens data of the imaging lens according to Example 3, where FIG. 11A shows basic lens data, and FIG. 11B shows aspherical data;

FIGS. 12A and 12B are diagrams showing lens data of the imaging lens according to Example 4, where FIG. 12A shows basic lens data, and FIG. 12B shows aspherical data;

FIGS. 13A and 13B are diagrams showing lens data of the imaging lens according to Example 5, where FIG. 13A shows basic lens data, and FIG. 13B shows aspherical data;

FIGS. 14A and 14B are diagrams showing lens data of the imaging lens according to Example 6, where FIG. 14A shows basic lens data, and FIG. 14B shows aspherical data;

FIGS. 15A and 15B are diagrams showing lens data of the imaging lens according to Example 7, where FIG. 15A shows basic lens data, and FIG. 15B shows aspherical data;

FIGS. 16A and 16B are diagrams showing lens data of the imaging lens according to Example 8, where FIG. 16A shows basic lens data, and FIG. 16B shows aspherical data;

FIG. 17 is a diagram showing values corresponding to the conditional expressions in the respective Examples;

FIG. 18A shows spherical aberration, FIG. 18B shows astigmatism, and FIG. 18C shows distortion;

FIG. 19A shows spherical aberration, FIG. 19B shows astigmatism, and FIG. 19C shows distortion;

FIGS. 20A-20C are aberration diagrams showing various aberrations of the imaging lens according to Example 3, where FIG. 20A shows spherical aberration, FIG. 20B shows astigmatism, and FIG. 20C shows distortion;

FIGS. 21A-21C are aberration diagrams showing various aberrations of the imaging lens according to Example 4, where FIG. 21A shows spherical aberration, FIG. 21B shows astigmatism, and FIG. 21C shows distortion;

FIG. 22A shows spherical aberration, FIG. 22B shows astigmatism, and FIG. 22C shows distortion;

FIGS. 23A-22C are aberration diagrams showing various aberrations of the imaging lens according to Example 6, where FIG. 23A shows spherical aberration.

FIG. 24A shows spherical aberration, FIG. 24B shows astigmatism, and FIG. 24C shows distortion;

FIG. 25A shows spherical aberration, FIG. 25B shows astigmatism, and FIG. 25C shows distortion;

DETAILED DESCRIPTION OF THE EXEMPLARY EMBODIMENTS

In an imaging lens according to the first or the second aspect of the invention, the whole lens system is configured to include four lenses in which each lens shape and power is appropriately set and the specific conditional expression is satisfied. Thus, it is possible to achieve a decrease in size of the whole system and high imaging performance.

In a camera module according to an aspect of the invention, the camera module is configured to output the imaging signal based on the optical image formed by the imaging lens of the invention that has a small size and high imaging performance. Thus, it is possible to downsize the whole module and it is also possible to obtain a high resolution imaging signal.

In an imaging apparatus according to an aspect of the invention, the imaging apparatus is equipped with the camera module of the invention. Thus, it is possible to downsize the camera part and obtain a high resolution imaging signal. In addition, it is also possible to obtain a high resolution photographic image based on the imaging signal.

Hereinafter, exemplary embodiments of the invention will be described in detail with reference to drawings.

Figure 1:
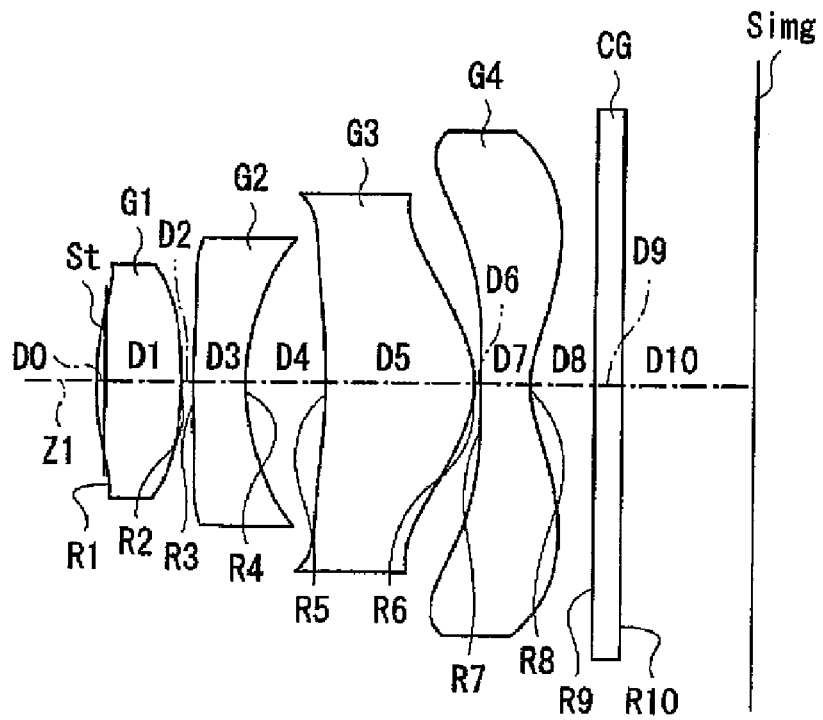
FIG. 1 is a sectional view of a first exemplary configuration of an imaging lens according to an exemplary embodiment of the invention, corresponding to Example 1.

FIG. 1 shows a first exemplary configuration of an imaging lens according to an exemplary embodiment of the invention. The exemplary configuration corresponds to a lens configuration of a first numerical example (shown in FIGS. 9A and 9B) to be described later. Likewise, FIGS. 2 to 8 show sectional views of second to eighth exemplary configurations corresponding to lens configurations of second to eighth numerical examples to be described later. In FIGS. 1 to 8, the reference sign Ri represents a radius of curvature of i-th surface, where the number i is the sequential number that sequentially increases as it gets closer to an image side (an imaging or image formation side) when a surface of a lens element closest to an object side is regarded as a first surface (an aperture diaphragm St is a zeroth element). The reference sign Di represents an on-axis surface spacing between i-th surface and (i+1)th surface on an optical axis Z1. By the way, since the respective exemplary configurations are basically similar in configuration, the following description will be given based on the exemplary configuration of an imaging lens shown in FIG. 1 and, as the need arises, the exemplary configurations shown in FIGS. 2 to 8 will also be described.

The imaging lens according to the embodiment can be incorporated and used in various imaging apparatuses, especially, relatively small portable terminal apparatuses such as a digital still camera, a cellular phone equipped with a camera, and a PDA using an imaging device such as a CCD or a CMOS. The imaging lens includes, in order from the object side, an aperture diaphragm St as an embodiment of the stop, a first lens G1, a second lens G2, a third lens G3 and a fourth lens G4 along the optical axis Z1. In the imaging plane (an imaging surface) Simg of this imaging lens, there is arranged an imaging device (not shown in the drawing) such as a CCD. Between the fourth lens G4 and the imaging plane (the imaging surface), there may be interposed an optical member CG such as a low-pass filter, an infrared cut filter, or a cover glass for protecting the imaging surface.

The aperture diaphragm St is an optical aperture stop, and the aperture diaphragm St may be disposed closest to the object side. Here, 'closest to the object side' is defined to include not only the case where the aperture diaphragm St is disposed on the optical axis on a vertex of an object side surface of the first lens G1 as described of the exemplary configurations shown in FIGS. 2 and 5, but also the case where the aperture diaphragm St is disposed on the optical axis Z1 between a vertex of an object side surface and a vertex of an image side surface of the first lens G1 as described in the other exemplary configurations. Particularly, the aperture diaphragm St may be disposed closer to the object side, for example, on the optical axis between the vertex of the object side surface of the first lens G1 and an end edge E (see FIG. 4) of the object side surface of the first lens G1.

The first lens G1 has a positive power. The first lens G1 may have a biconvex shape in the vicinity of the optical axis. The second lens G2 has a negative power. The second lens G2 may have a meniscus shape in which a convex surface is directed toward the object side. The third lens G3 has a positive power in a convex surface thereof facing toward the image side in the vicinity of the optical axis. The object side surface of the third lens G3 is formed as, for example, a concave surface in the vicinity of the optical axis. Meanwhile, as shown in the exemplary configuration in FIG. 5, the object side surface of the third lens G3 may be formed as a convex surface in the vicinity of the optical axis.

The fourth lens G4 has a negative power and has a concave surface or a flat surface facing toward the object side in the vicinity of the optical axis. In addition, the object side surface of the fourth lens G4 is formed as a concave surface in the vicinity of the optical axis in exemplary configurations shown in FIGS. 1 to 7, and is formed as a flat surface in the exemplary configuration shown in FIG. 8.

Each of the first lens G1, the second lens G2, the third lens G3, and the fourth lens G4 may include at least one aspheric surface. Particularly, in the fourth lens G4, the image side surface thereof may have a shape which is concave toward the image side in the vicinity of the optical axis and convex toward the image side in the periphery thereof.

In this case, when the lens has an aspheric shape, the second lens G2, the third lens G3, and the fourth lens G4 mostly have a complex and large shape, as compared with the first lens G1. Hence, the second lens G2, third lens G3 and fourth lens G4 may be made of resin in view of processability and manufacturing cost. The first lens G1 may be made of resin when manufacturing cost is important. Further, to improve imaging performance, the first lens G1 may be made of glass.

In the imaging lens, any one of the following conditional expressions (1) and (2) may be satisfied. Here, f is defined as a focal length of the whole system, f4 is defined as a focal length of the fourth lens G4, and f1 is defined as a focal length of the first lens G1.

$$0.28 < |f4/f| < 0.60 \tag{1}$$

$$0.50 < f1/f < 1.10 \tag{2}$$

In addition, the following conditions may be properly and selectively satisfied. Here, f2 is defined as a focal length of the second lens G2, and f3 is defined as a focal length of the third lens G3. ν1 is defined as an Abbe number of the first lens G1 at the d-line, and ν2 is defined as an Abbe number of the second lens G2 at the d-line. D4 is defined as a space on the optical axis between the second lens G2 and the third lens G3. R5 is defined as a radius of curvature of an object side surface of the third lens G3, and R6 is defined as a radius of curvature of an image side surface of the third lens G3.

$$0.5<|f2/f|<3 \quad (3)$$

$$0.2<f3/f<1.5 \quad (4)$$

$$20<\nu1-\nu2 \quad (5)$$

$$0.1<D4/f<0.3 \quad (6)$$

$$|R5|>|R6| \quad (7)$$

Figure 26:
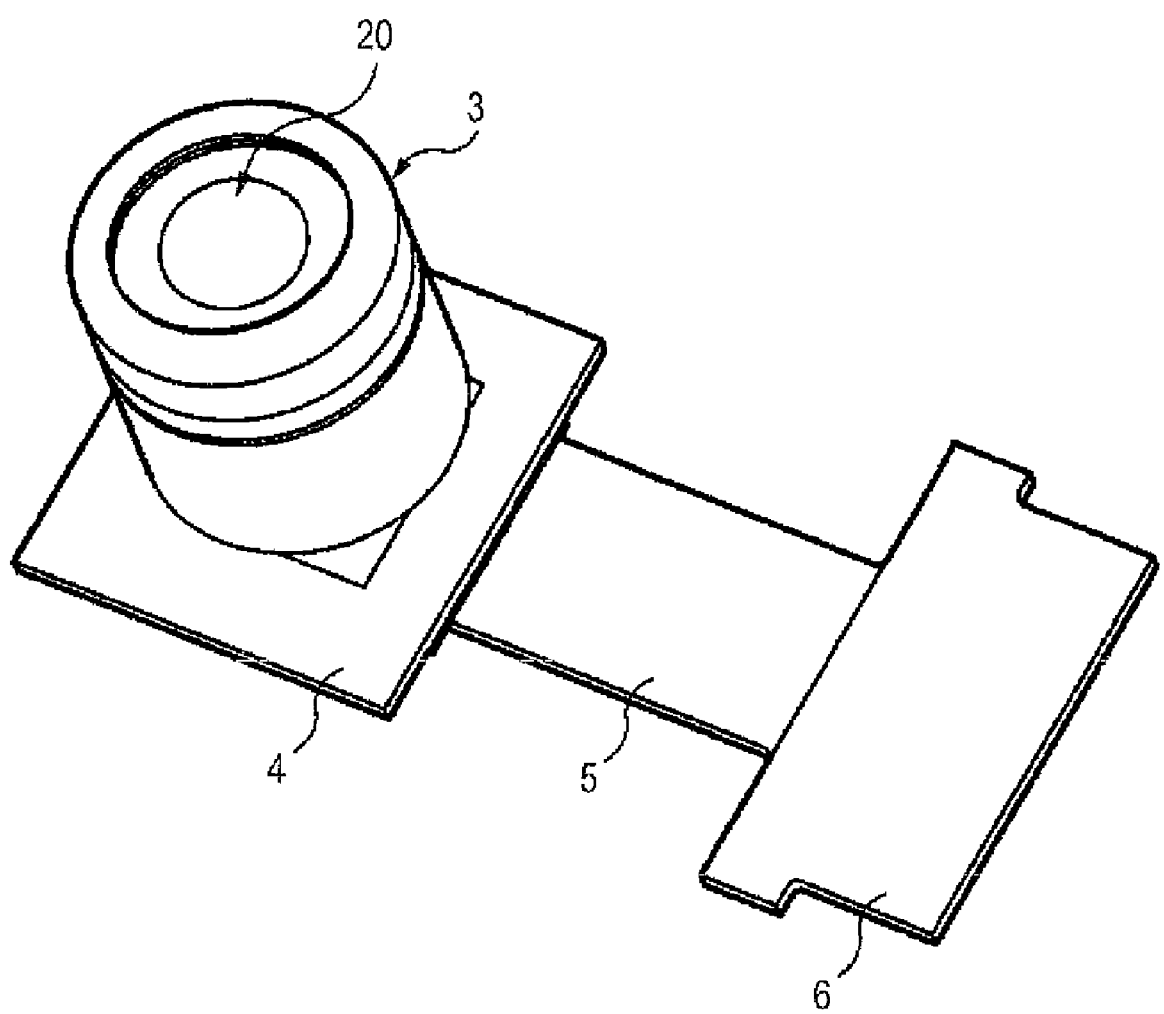
FIG. 26 is a perspective view illustrating an exemplary configuration of a camera module according to an exemplary embodiment of the invention.

FIG. 26 shows an exemplary configuration of the camera module equipped with the imaging lens according to the embodiment. In addition, FIGS. 27A and 27B show a cellular phone equipped with a camera, as an example of the imaging apparatus equipped with the camera module shown in FIG. 26.

Figure 27A:
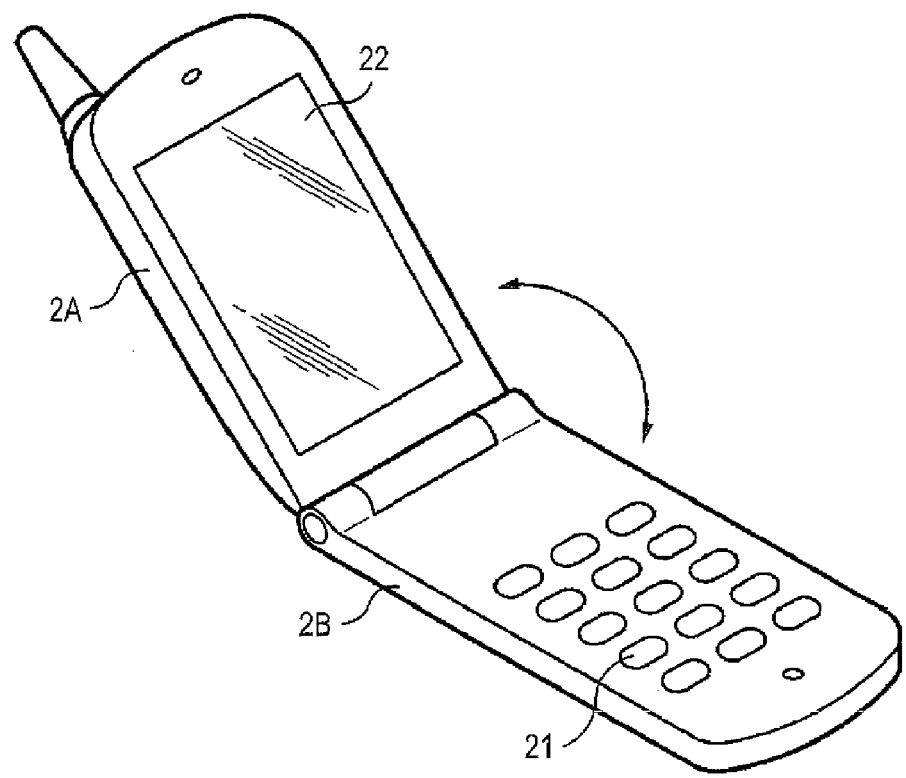
FIGS. 27A and 27B are perspective views illustrating an exemplary configuration of an imaging apparatus according to an exemplary embodiment of the invention.
Figure 27B:
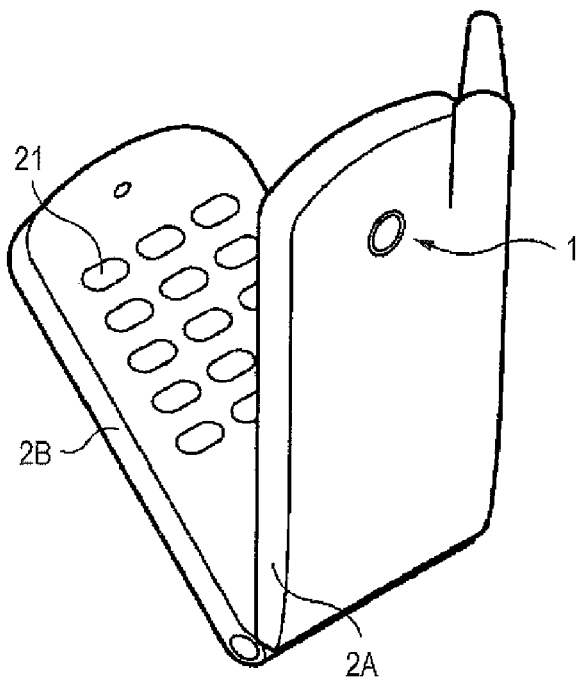

As shown in FIGS. 27A and 27B, the cellular phone equipped with a camera has an upper casing 2A and a lower casing 2B, and is configured to be able to freely rotate both of the casings in an arrow direction shown in FIG. 27A. In the lower casing 2B, an operation key 21 and the like are disposed. In the upper casing 2A, a camera section 1 (shown in FIG. 27B) and a display section 22 (shown in FIG. 27A) are disposed. The display section 22 is formed of a display panel such as a LCD (Liquid Crystal Display) or an EL (Electroluminescence) panel. The display section 22 is disposed on a surface of the upper casing 2A that is an inner surface in a state where the cellular phone is folded. The display section 22 is operable to display not only various menus for a telecommunication function but also images taken by the camera section 1. The camera section 1 is disposed on, for example, the rear side of the upper casing 2A. However, a location on which the camera section 1 is disposed is not limited to this.

The camera section 1 has the camera module according to the embodiment. As shown in FIG. 26, the camera module includes a barrel 3 in which an imaging lens 20 to be described later is placed, a supporting board 4 which supports the barrel 3, and the imaging device (not shown in the drawing) which is disposed on a location corresponding to the imaging plane of the imaging lens 20 on the supporting board 4. The camera module further includes a flexible board 5 which is electrically connected to the imaging device on the supporting board 4, and a external connection terminal 6 which is configured to be connected to the flexible board 5 and be able to connected to a signal processing circuit of a terminal device main body in cellular phones and the like equipped with a camera. These components are integrally formed.

In the camera module shown in FIG. 26, an optical image formed by the imaging lens 20 is converted into an electric imaging signal by the imaging device. Subsequently, the imaging signal is given as an output to the signal processing circuit in the imaging apparatus main body via the flexible board 5 and the external connection terminal 6. In this case, in the camera module, the imaging lens 20 according to the embodiment is employed, and thus it is possible to obtain a high resolution imaging signal in which aberrations are sufficiently corrected. In the imaging apparatus main body, it is possible to generate a high resolution image based on the imaging signal.

In addition, the imaging apparatus according to the embodiment is not limited to a cellular phone equipped with a camera, and may employ, for example, a digital still camera, a PDA, or the like.

Hereinafter, effects and advantages of the imaging lens configured as described above, particularly, effects and advantages regarding the conditional expressions will be described in further detail.

In the imaging lens according to the embodiment, the whole lens system is configured to include four lenses of, in order from an object side, positive, negative, positive, and negative power, in which each lens shape and power is appropriately set and the specific conditional expression is satisfied. Thus, it becomes easy to decrease the size of the whole system and obtain high imaging performance. Particularly, in the imaging lens of the invention, the lens (the fourth lens (G4) closest to the imaging side has a concave surface or flat surface facing toward the object side in the vicinity of the optical axis. Thus, this configuration is also advantageous in the decrease in size of the whole system and imaging performance. In addition, since the fourth lens G4 has a negative power, it becomes easy to secure a back focal length. When the positive power of the fourth lens G4 becomes too strong, it is difficult to secure the sufficient back focal length.

In addition, in the imaging lens, each of the first lens G1, the second lens G2, the third lens G3, and the fourth lens G4 include at least one aspheric surface. Thereby, it becomes easy to maintain aberration performance. Particularly, in the fourth lens G4, incident rays are divided for every field angle, as compared with the first lens G1, the second lens G2, and the third lens G3. Hence, the image side surface of the fourth lens G4 that is the last lens surface closest to the imaging device is configured to have a shape which is concave toward the image side in the vicinity of the optical axis and convex toward the image side in the periphery thereof. Thereby, aberration correction is properly performed for every field angle, and thus it is possible to control angles of light rays incident on the imaging device under a constant angle. Accordingly, it is possible to reduce non-uniformity in light intensity in the whole range of the imaging plane, and it becomes easy to correct field curvature and distortion.

Generally, it is preferred that the imaging lens be telecentric. Specifically, a principal ray may be incident on the imaging device in parallel to the optical axis (that is, the incident angle on the imaging surface approaches to zero degree with respect to the normal line of the imaging surface). To secure telecentricity, the aperture diaphragm St may be disposed closest to the object side. On the other hand, when the aperture diaphragm St is more distanced from the object side surface of the first lens G1 toward the object side, the changed distance (the distance between the aperture diaphragm St and the lens surface closest to the object side) is added as a length of the optical path. Thus, it is difficult to downsize the whole system. Accordingly, the aperture diaphragm St is disposed at the same location as a vertex of the object side surface of the first lens G1 on the optical axis Z1, or is disposed between a vertex of the object side surface of the first lens G1 and a vertex of the image side surface thereof, and thus it is possible to achieve a decrease in size of the whole system and secure telecentricity. When securing telecentricity is more important, the aperture diaphragm St can be disposed on the optical axis between the vertex of the object side surface in the first lens G1 and an end edge E (see FIG. 4) of the object side surface in the first lens G1.

Hereinafter, the conditional expressions will be described in details.

The conditional expression (1) relates to the focal length f4 of the fourth lens G4. When the upper limit of the numerical range thereof is exceeded, the power of the fourth lens G4 becomes weak. Thus, it is difficult to decrease the size of the whole system. When the lower limit thereof is exceeded, the power of the fourth lens G4 becomes strong, and the power of the third lens G3 should be made strong in order to offset the power of the fourth lens G4. Thus, off-axis performance deteriorates.

To obtain more desirable performance, instead of the conditional expression (1), the following numerical range may be satisfied.

$$0.30<|f4/f|<0.59 \tag{1A}$$

The conditional expression (2) relates to the focal length f1 of the first lens G1. When the lower limit of the numerical range thereof is exceeded, the power of the first lens G1 becomes too strong. Thus, spherical aberration increases, and it is difficult to secure the back focal length thereof. When the upper limit thereof is exceeded, it is difficult to decrease the size of the whole system. Thus, it is also difficult to correct field curvature and astigmatism.

To obtain more desirable performance, instead of the conditional expression (2), the following numerical range may be satisfied.

$$0.50<f1/f<1.00 \tag{2A}$$

The conditional expression (3) relates to the focal length f2 of the second lens G2. When the lower limit of the numerical range thereof is exceeded, the power of the second lens G2 becomes too strong. Thus, aberrations increase. When the upper limit thereof is exceeded, the power of the second lens G2 becomes too weak. Thus, it is also difficult to correct field curvature and astigmatism.

To obtain more desirable performance, instead of the conditional expression (3), the following numerical range may be satisfied.

$$0.7<|f2/f|<2.7 \tag{3A}$$

The conditional expression (4) relates to the focal length f3 of the third lens G3. When the lower limit of the numerical range thereof is exceeded, the positive power of the third lens G3 becomes too strong. Thus, performance deteriorates, and it is difficult to secure the back focal length thereof. When the upper limit thereof is exceeded, the positive power of the third lens G3 becomes too weak. Thus, it is difficult to sufficiently correct aberrations.

To obtain more desirable performance, instead of the conditional expression (4), the following numerical range may be satisfied.

$$0.3<f3/f<1.1 \tag{4A}$$

The conditional expression (5) defines the dispersion of the first lens G1 and the second lens G2. By satisfying the numerical range thereof, it is possible to achieve reduction in longitudinal chromatic aberration.

To obtain more desirable performance, instead of the conditional expression (5), the following numerical range may be satisfied.

$$20<\nu1-\nu2<35 \tag{5A}$$

The conditional expression (6) relates to the space between the second lens G2 and the third lens G3 and a focal length f of the whole system. When the upper limit of the numerical range is exceeded, it is difficult to decrease the size of the whole system. When the lower limit thereof is exceeded, it is difficult to secure the space between the second lens G2 and the third lens G3.

To obtain more desirable performance, instead of the conditional expression (6), the following numerical range may be satisfied.

$$0.14<D4/f<0.25 \tag{6A}$$

The conditional expression (7) relates to the radius of curvature of the third lens G3. To correct aberrations generated in the first lens G1 and second lens G2, the absolute value of the radius of curvature R5 of the object side surface thereof is preferably larger than that of the radius of curvature R6 of the image side surface thereof.

As described above, according to the imaging lens of the embodiment, it is possible to achieve decrease in size of the whole system and high imaging performance. In addition, according to the camera module of the embodiment, the camera module is configured to output the imaging signal based on the optical image formed by the imaging lens of the invention that has a small size and high imaging performance. Thus, it is possible to downsize the whole module and it is also possible to obtain a high resolution imaging signal. According to the imaging apparatus of the embodiment, the imaging apparatus is equipped with the camera module. Thus, it is possible to downsize the camera part and obtain a high resolution imaging signal. In addition, it is also possible to obtain a high resolution photographic image based on the imaging signal.

EXAMPLES

Hereinafter, specific numerical examples of the imaging lens according to the embodiment will be described. In the following explanation, first to eighth numerical examples will be collectively described.

FIGS. 9A and 9B show specific lens data corresponding to the configuration of the imaging lens shown in FIG. 1. Particularly, FIG. 9A shows basic lens data, FIG. 9B shows aspherical data. In the column of the surface number Si in the lens data shown in FIG. 9A, the number i represents the sequential number of i-th surface that sequentially increases as it gets closer to the image side when a surface of a component closest to the object side is regarded as a first surface (an aperture diaphragm St is a zeroth element), with regard to the imaging lens according to Example 1. In the column of the radius of curvature Ri, there are shown values (mm) of the radius of curvature of i-th surface from the object side to correspond to the reference sign Ri in FIG. 1. Likewise, in the column of the on-axis surface spacing Di, there are shown spaces (mm) on the optical axis between the i-th surface Si and the (i+1)th surface Si+1 on the optical axis from the object side. In the column of Ndj, there are shown values of the refractive index at the d-line (587.6 nm) of the j-th optical component from the object side. In the column of vdj, there are shown values of the Abbe number at the d-line of the j-th optical component from the object side. Outside the columns in FIG. 9A, as data, there are shown values of the focal distance f (mm) of the whole lens system and F number (Fno.).

In the imaging lens according to Example 1, both surfaces of the first lens G1 to the fourth lens G4 are formed in an aspheric shape. In the basic lens data shown in FIG. 9A, the radiuses of curvature of these aspheric surfaces are represented as numerical values of the radius of curvature in the vicinity of the optical axis.

FIG. 9B shows aspherical data in the imaging lens according to Example 1. In the numerical values represented as the aspherical data, the reference sign 'E' means that a numerical value following this is a 'power exponent' having a base of 10 and that this numerical value having a base of 10 and expressed by an exponential function is multiplied by a numerical value before the 'E'. For example, it means that, for '1.0E-02', '10x10⁻²'.

As regards the aspherical data, there are shown the respective coefficients Ai and K used in an aspheric surface shape expression expressed by the following expression (A). Here, Z represents a length (mm) of a perpendicular dropped from a point, which exists on an aspheric surface at a position of a height h from the optical axis, to a tangent plane to the vertex of the aspheric surface (a plane perpendicular to the optical axis). In the imaging lens of Example 1, as the aspheric surface coefficients Ai, there are used third to tenth-order coefficients A3 to A10 effectively.

$$Z = C \cdot h^2 / \{1 + (1 - K \cdot C^2 \cdot h^2)^{1/2}\} + \Sigma A_i \cdot h^i \quad (A),$$

where
Z is a depth (mm) of an aspheric surface,
h is a distance (a height, mm) from the optical axis (a height) to the lens surface,
K is an eccentricity,
C is a paraxial curvature equal to 1/R (R: a paraxial radius of curvature), and
Ai is an i-th order (i is an integer not less than 3) aspheric surface coefficient.

Figure 2:
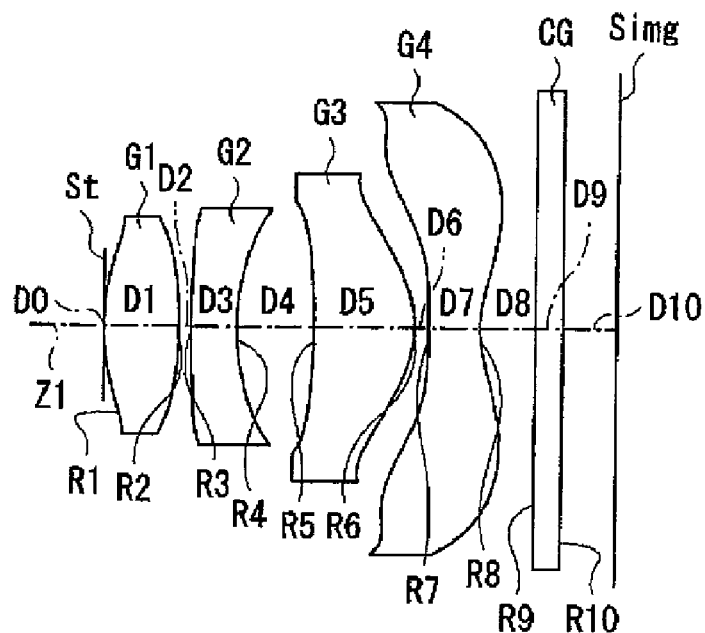
FIG. 2 is a sectional view of a second exemplary configuration of an imaging lens according to an exemplary embodiment of the invention, corresponding to Example 2.
Figure 3:
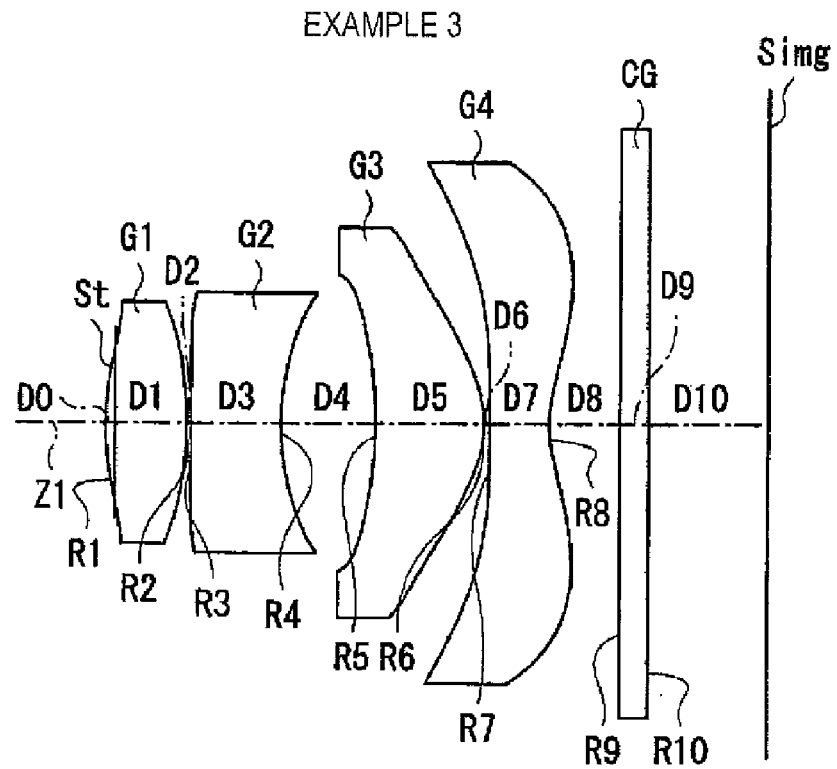
FIG. 3 is a sectional view of a third exemplary configuration of an imaging lens according to an exemplary embodiment of the invention, corresponding to Example 3.
Figure 4:
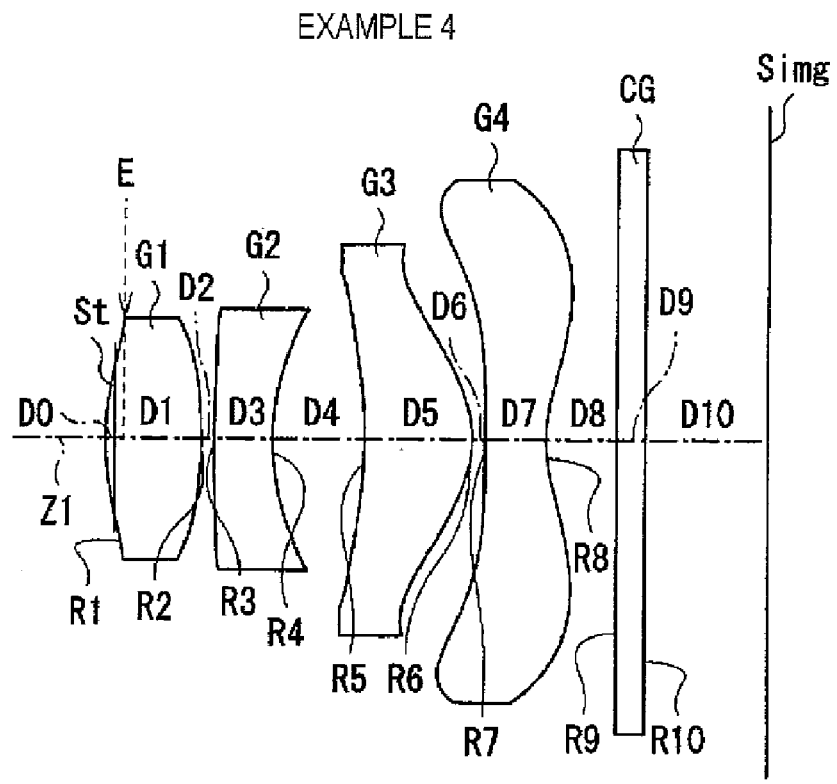
FIG. 4 is a sectional view of a fourth exemplary configuration of an imaging lens according to an exemplary embodiment of the invention, corresponding to Example 4.
Figure 5:
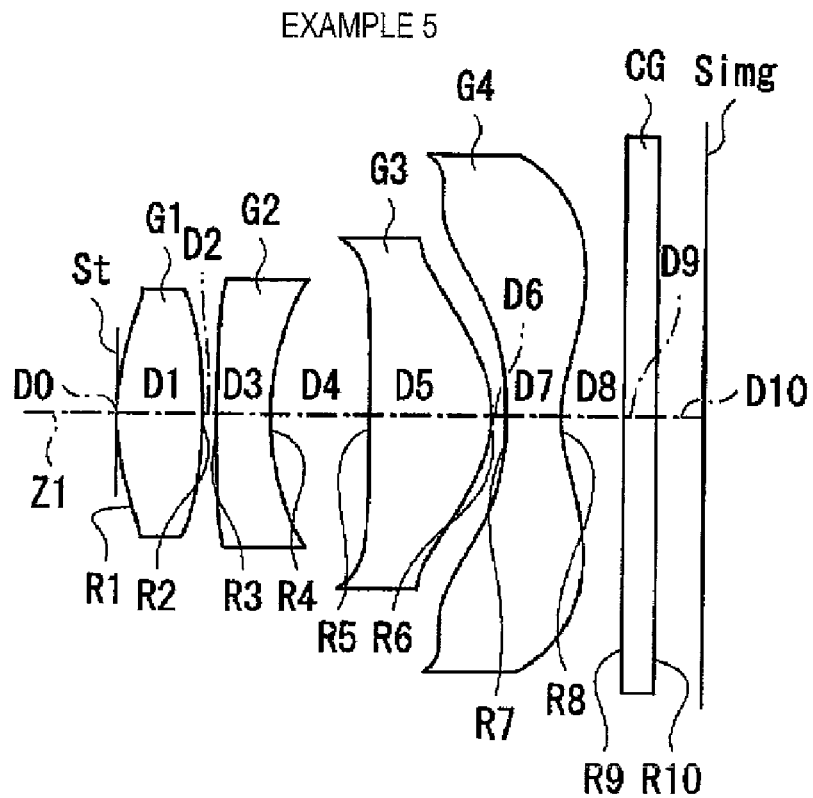
FIG. 5 is a sectional view of a fifth exemplary configuration of an imaging lens according to an exemplary embodiment of the invention, corresponding to Example 5.
Figure 6:
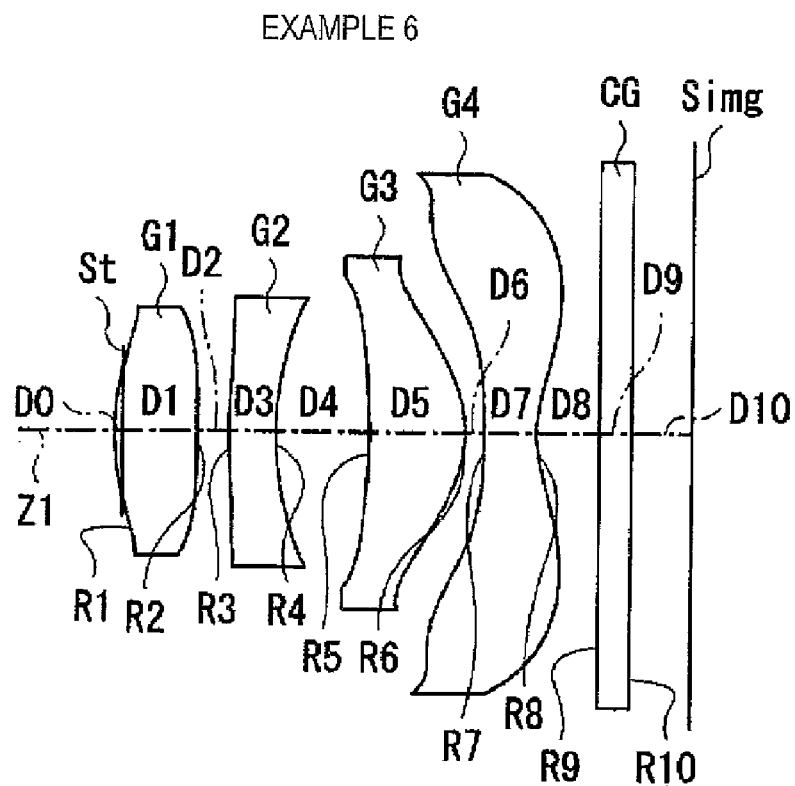
FIG. 6 is a sectional view of a sixth exemplary configuration of an imaging lens according to an exemplary embodiment of the invention, corresponding to Example 6.
Figure 7:
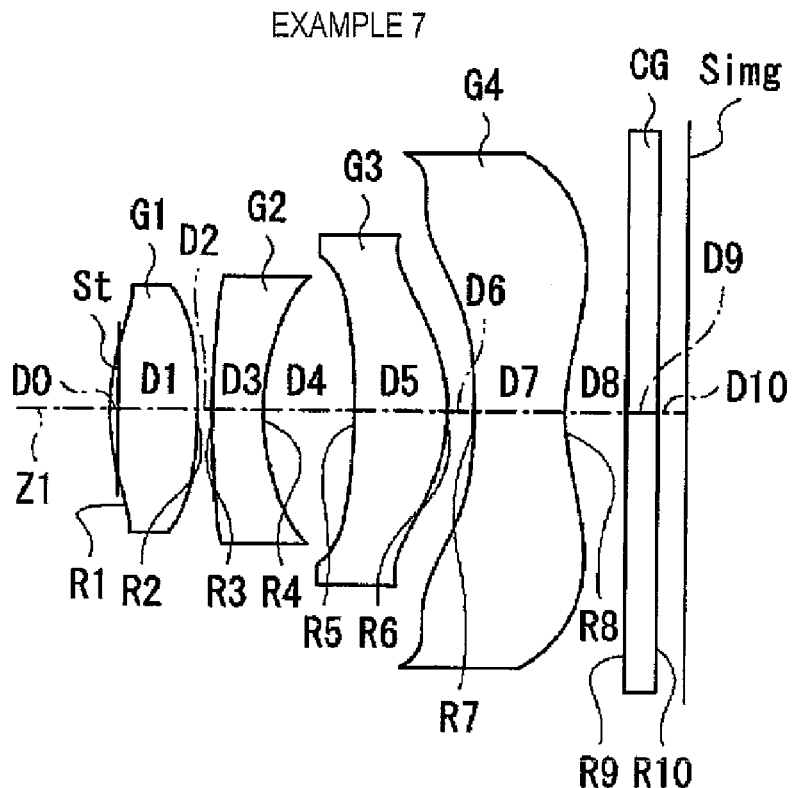
FIG. 7 is a sectional view of a seventh exemplary configuration of an imaging lens according to an exemplary embodiment of the invention, corresponding to Example 7.
Figure 8:
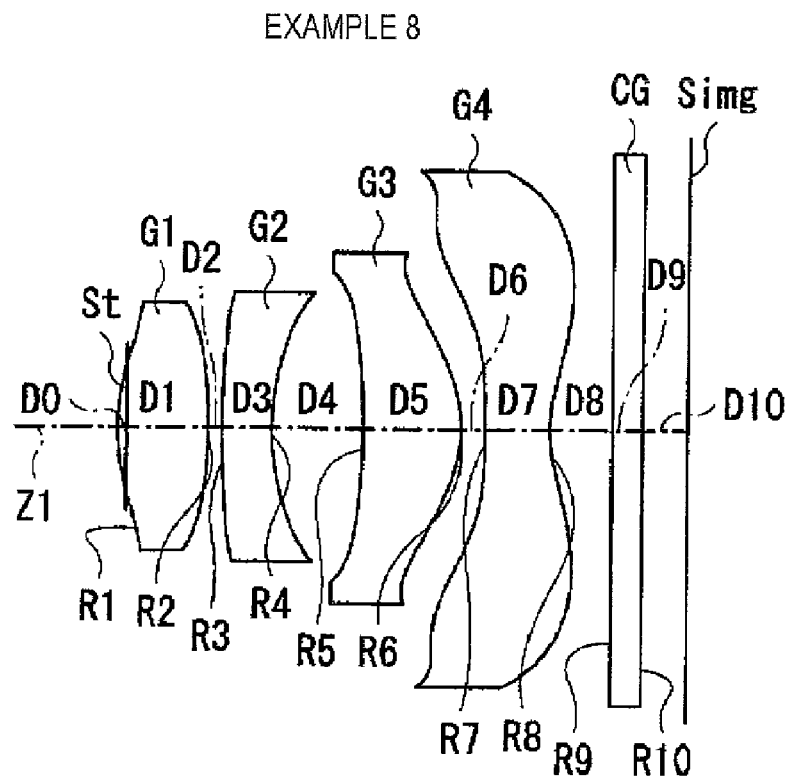
FIG. 8 is a sectional view of an eighth exemplary configuration of an imaging lens according to an exemplary embodiment of the invention, corresponding to Example 8.

Similarly to the imaging lens according to Example 1, FIGS. 10A and 10B show specific lens data corresponding to the configuration of the imaging lens shown in FIG. 2 as Example 2. Similarly, FIGS. 11A and 11B to FIGS. 16A and 16B show specific lens data corresponding to the configuration of the imaging lens shown in FIGS. 3 to 8 as Examples 3 to 8. In Examples 2 to 8, similarly to the imaging lens according to Example 1, both surfaces of the first lens G1 to the fourth lens G4 are formed in an aspheric shape.

In addition, in Example 3 and Example 6, the first lens G1 is made of glass, and the second lens G2 to the fourth lens G4 are made of resin. In the other examples, the first lens G1 to the fourth lens G4 are made of resin.

In addition, FIG. 17 shows values corresponding to the above-mentioned conditional expressions while putting them together about the respective Examples. As shown in FIG. 17, the values of the respective Examples 1 to 6 and Example 8 are all within the numerical range of the conditional expressions. The values of Example 7 are out of the numerical range of the conditional expression (1), but satisfy all the numerical range of the other conditional expressions.

In addition, as comparative examples, there are shown values corresponding to conditional expressions in configurations of Example 5 and 9 described in JP-A-2007-17984. Example 5 in Patent Document 7 is described as Comparative Example 1, and Example 9 in JP-A-2007-17984 is described as Comparative Example 2. Configuration of Comparative Examples 1 and 2 are different from the configuration of the examples mentioned above, particularly, in that the numerical range of the conditional expressions (1) and (2) is satisfied.

Figure 18A:
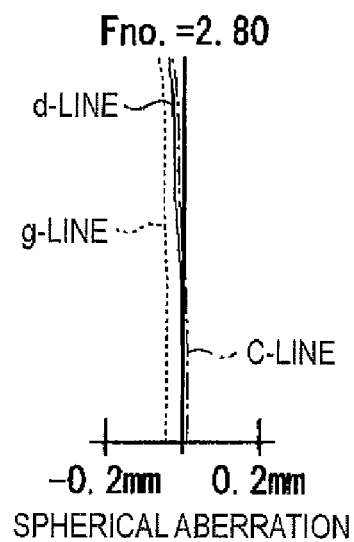
FIGS. 18A-18C are aberration diagrams showing various aberrations of the imaging lens according to Example 1, where
Figure 18B:
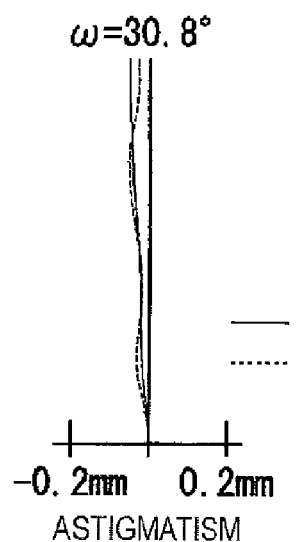
Figure 18C:
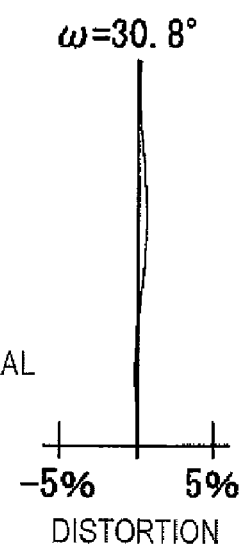

FIGS. 18A to 18C show spherical aberration, astigmatism, and distortion in the imaging lens according to Example 1, respectively. In the aberration diagrams, there are shown aberrations at in which the d-line (a wavelength 587.6 nm) is set as a reference wavelength. In the spherical aberration diagram, there are also shown aberrations at the g-line (a wavelength 435.8 nm) and C-line (a wavelength 656.3 nm). In the astigmatism diagram, the solid line represents a sagittal direction, and the broken line represents aberrations of a tangential direction. The Fno, represents a F number, and the ca represents a half angle of view.

Figure 19A:
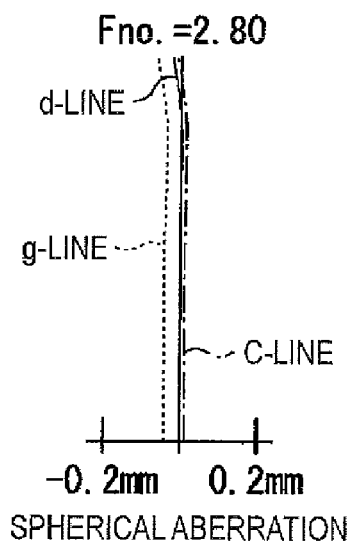
FIGS. 19A-19C are aberration diagrams showing various aberrations of the imaging lens according to Example 2, where
Figure 19B:
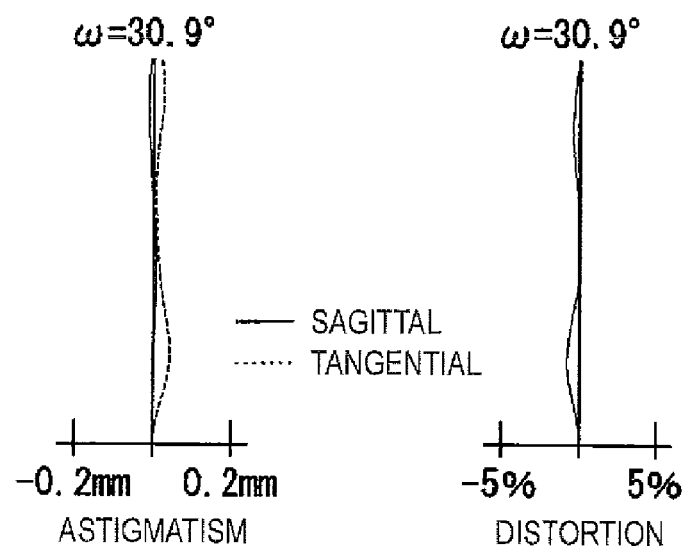
Figure 19C:
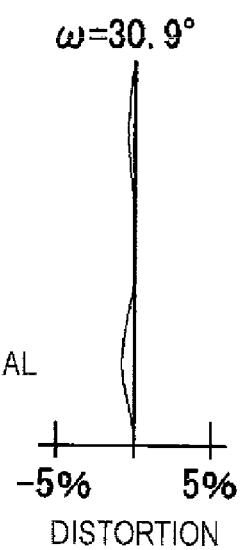
Figure 22A:
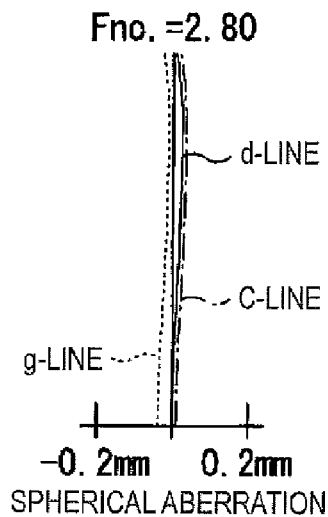
FIGS. 22A-22C are aberration diagrams showing various aberrations of the imaging lens according to Example 5, where
Figure 22B:
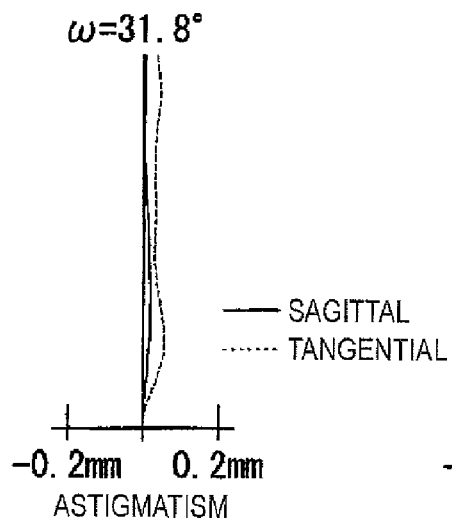
Figure 22C:
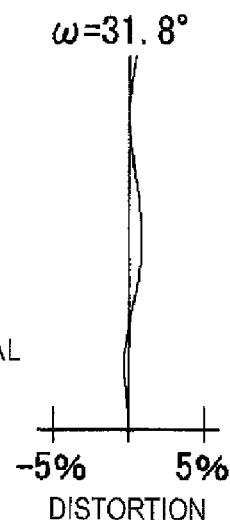
Figure 23A:
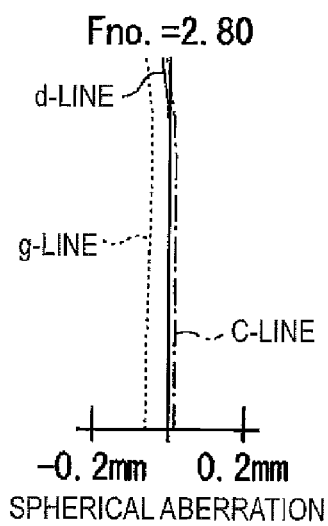
Figure 23B:
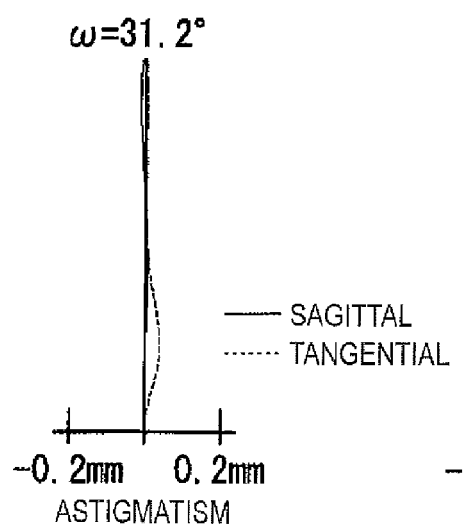
FIG. 23B shows astigmatism.
Figure 23C:
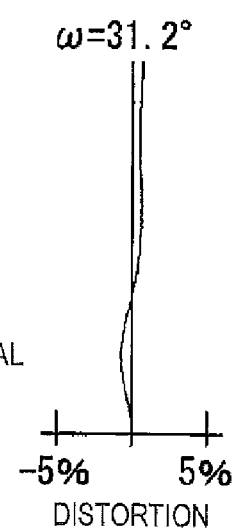
FIG. 23C shows distortion.
Figure 24A:
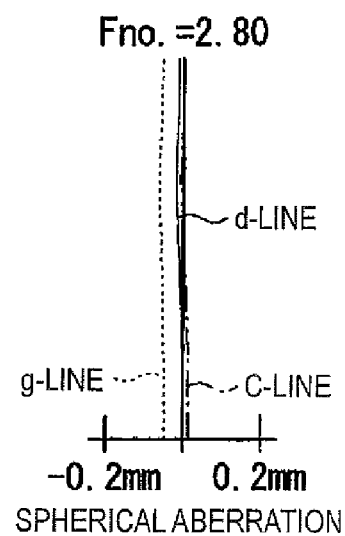
FIGS. 24A-24C are aberration diagrams showing various aberrations of the imaging lens according to Example 7, where
Figure 24B:
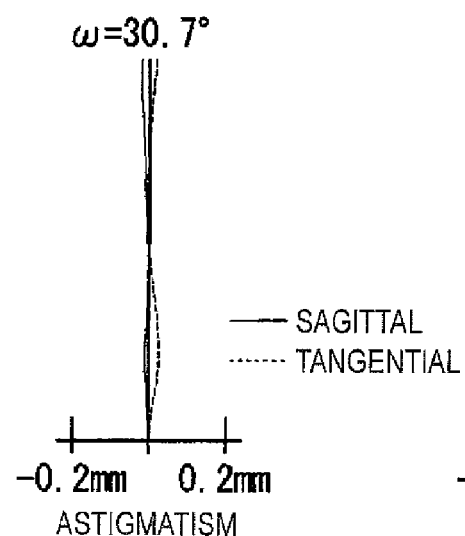
Figure 24C:
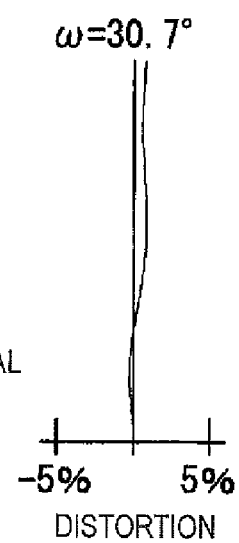
Figure 25A:
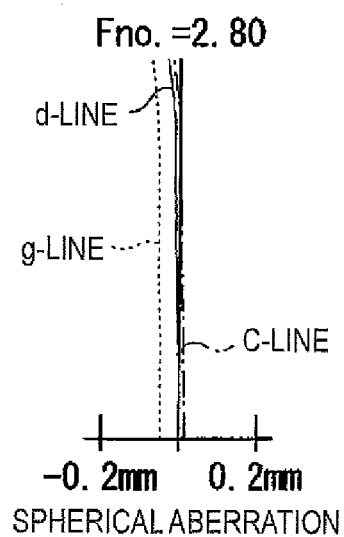
FIGS. 25A-25C are aberration diagrams showing various aberrations of the imaging lens according to Example 8, where
Figure 25B:
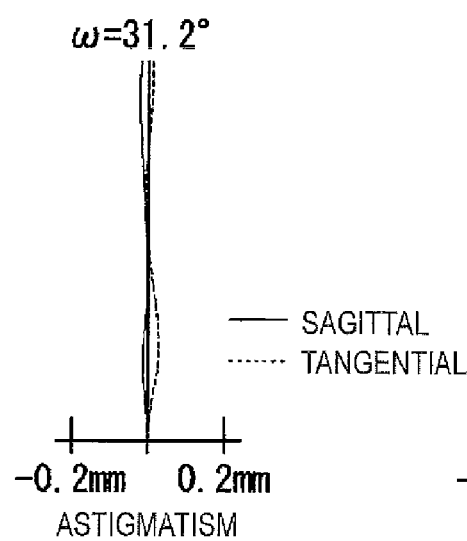
Figure 25C:
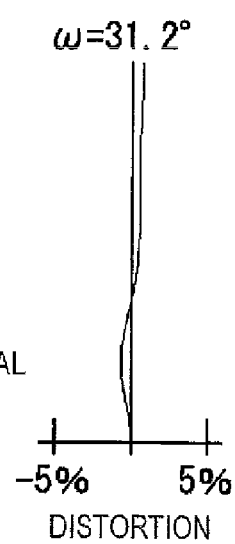

Similarly, FIGS. 19A to 19C show various aberrations in the imaging lens according to Example 2. Similarly, FIGS. 20A to 20C show various aberrations in the imaging lens according to Example 3. Similarly, FIGS. 21A to 21C show various aberrations in the imaging lens according to Example 4. Similarly, FIGS. 22A to 22C show various aberrations in the imaging lens according to Example 5. Similarly, FIGS. 23A to 23C show various aberrations in the imaging lens according to Example 6. Similarly, FIGS. 24A to 24C show various aberrations in the imaging lens according to Example 7. Similarly, FIGS. 25A to 25C show various aberrations in the imaging lens according to Example 8.

As known from the numerical data and the aberration diagrams mentioned above, it is possible to achieve the decrease in size of the whole system and high imaging performance according to each of the examples.

In addition, the invention is not limited to the embodiments and the examples, and may be modified to various forms. For example, the values of the radius of curvature, the on-axis surface spacing, and the refractive index in the lens components are not limited to the values shown in the numerical examples, and may have different values.

What is claimed is:

1. An imaging lens comprising: in order from an object side of the imaging lens,
   a first lens having a positive power;
   a second lens having a negative power, wherein the second lens has a meniscus shape in which a convex surface is directed toward the object side;
   a third lens having a positive power and having a convex surface on an image side thereof; and
   a fourth lens having a negative power and having a concave surface or a flat surface on the object side at the optical axis of the imaging lens, and
   a stop on the optical axis between a vertex of an object side surface of the first lens and a vertex of an image side surface of the first lens,
   the imaging lens satisfying conditional expressions (1') and (6):

$$0.470 \leq |f4/f| < 0.60 \quad (1')$$

$$0.1 < D4/f < 0.3 \quad (6)$$

wherein f is a focal length of the imaging lens, f4 is a focal length of the fourth lens, and D4 is a space on the optical axis between the second lens and the third lens.

2. The imaging lens according to claim 1, further satisfying conditional expressions:

$$0.5 < |f2/f| < 3 \quad (3)$$

$$0.2 < f3/f < 1.5 \quad (4)$$

wherein f2 is a focal length of the second lens, and f3 is a focal lenth of the third lens.

3. The imaging lens according to claim 1, further satisfying conditional expression:

$$20 < v1 - v2 \quad (5)$$

wherein v1 is an Abbe number of the first lens at the d-line, and v2 is an Abbe number of the second lens at the d-line.

4. The imaging lens according to claim 1, wherein the first lens has a biconvex shape.

5. The imaging lens according to claim 1, further satisfying conditional expression:

$$|R5| > |R6| \quad (7)$$

wherein R5 is a radius of curvature of an object side surface of the third lens, and R6 is a radius of curvature of an image side surface of the third lens.

6. The imaging lens according to claim 1, wherein each of the first lens, the second lens, the third lens, and the fourth lens includes at least one aspheric surface.

7. The imaging lens according to claim 1, wherein each of the first lens, the second lens, the third lens, and the fourth lens is made of resin.

8. The imaging lens according to claim 1, wherein the first lens is made of glass.

9. The imaging lens according to claim 1, wherein the stop is disposed on the optical axis between the vertex of the object side surface of the first lens and an end edge of the object side surface of the first lens.

10. A camera module comprising:
an imaging lens according to claim 1: and
an imaging device that outputs an imaging signal based on an optical image formed by the imaging lens.

11. An imaging apparatus comprising a camera module according to claim 10.

12. The imaging lens according to claim 1, further satisfying conditional expression:

$$0.50 < f1/f < 1.10 \quad (2)$$

wherein f is a focal length of the imaging lens, and f1 is a focal length of the first lens.

13. The imaging lens according to claim 1, wherein the object side surface of the third lens is formed as a concave surface in the vicinity of the optical axis.

14. The imaging lens according to claim 1, wherein the image side surface of the fourth lens has a shape which is concave toward the image side in the vicinity of the optical axis and convex toward the image side in the periphery thereof.

15. The imaging lens according to claim 1, further satisfying conditional expression:

$$0.30 < |f4/f| < 0.59 \quad (1A)$$

wherein f is a focal length of the imaging lens, and f4 is a focal length of the fourth lens.

16. The imaging lens according to claim 1, further satisfying conditional expression:

$$0.50 < f1/f < 1.00 \quad (2A)$$

wherein f is a focal length of the imaging lens, and f1 is a focal length of the first lens.

17. The imaging lens according to claim 1, further satisfying conditional expression:

$$0.7 < |f2/f| < 2.7 \quad (3A)$$

wherein f is a local length of the imaging lens, and f2 is a focal length of the second lens.

18. The imaging lens according to claim 1, further satisfying conditional expression:

$$0.3 < f3/f < 1.1 \quad (4A)$$

wherein f is a focal length of the imaging lens, and f3 is a focal length of the third lens.

19. The imaging lens according to claim 1, further satisfying conditional expression:

$$20 < v1 - v2 < \pm \quad (5A)$$

wherein v1 is an Abbe number of the first lens at the d-line, and v2 is an Abbe number of the second lens at the d-line.

20. The imaging lens according to claim 1, further satisfying conditional expression:

$$0.14 < D4/f < 0.25 \quad (6A)$$

wherein D4 is a space on the optical axis between the second lens and the third lens.

21. An imaging lens comprising: in order from an object side of the imaging, lens,
a first lens having a positive power;
a second lens having a negative power, wherein the second lens has a meniscus shape in which a convex surface is directed toward the object side;
a third lens having a positive power and having a convex surface on an image side thereof: and
a fourth lens having a negative power and having a concave surface or a flat surface on the object side and in a vicinity of an optical axis thereof, and
a stop on the optical axis between a vertex of an object side surface of the first lens and a vertex of an image side surface of the first lens,
the imaging lens satisfying conditional expressions (1) and (6):

$$0.28 < |f4/f| < 0.60 \quad (1)$$

$$0.1 < D4/f < 0.3 \quad (6)$$

wherein f is a focal length of the imaging lens, f4 is a focal length of the fourth lens, and D4 is a space on the optical axis between the second lens and the third lens,
wherein the object side surface of the third lens is formed as a convex surface in the vicinity of the optical axis.

* * * * *